(12) United States Patent
Sato

(10) Patent No.: US 9,831,481 B2
(45) Date of Patent: *Nov. 28, 2017

(54) NONAQUEOUS ELECTROLYTE SECONDARY BATTERY AND SEPARATOR

(71) Applicant: Sony Corporation, Tokyo (JP)

(72) Inventor: Hironori Sato, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,086

(22) Filed: May 26, 2016

(65) Prior Publication Data
US 2016/0268572 A1 Sep. 15, 2016

Related U.S. Application Data

(63) Continuation of application No. 12/958,961, filed on Dec. 2, 2010, now Pat. No. 9,356,273.

(30) Foreign Application Priority Data

Dec. 4, 2009 (JP) ................................. P2009-277072

(51) Int. Cl.
*H01M 2/16* (2006.01)
*H01M 4/38* (2006.01)
(Continued)

(52) U.S. Cl.
CPC ......... *H01M 2/1686* (2013.01); *H01M 2/026* (2013.01); *H01M 2/0207* (2013.01);
(Continued)

(58) Field of Classification Search
None
See application file for complete search history.

(56) References Cited

U.S. PATENT DOCUMENTS

| 4,308,325 A | 12/1981 | Verzwyvelt |
| 7,670,717 B2 | 3/2010 | Ohata et al. |

(Continued)

FOREIGN PATENT DOCUMENTS

| CN | 1851957 | 10/2006 |
| CN | 101459232 | 6/2009 |

(Continued)

OTHER PUBLICATIONS

Atsushi et al. (JP, 2007-188777) (a raw machine translation) (Abstract, Detailed Description & Drawings) (Jul. 26, 2007).*

(Continued)

*Primary Examiner* — Miriam Stagg
*Assistant Examiner* — Carmen Lyles-Irving
(74) *Attorney, Agent, or Firm* — K&L Gates LLP

(57) ABSTRACT

A nonaqueous electrolyte secondary battery includes a positive electrode, a negative electrode, and a separator disposed between the positive electrode and the negative electrode. The separator includes a substrate layer and a surface layer formed on at least one principal plane of the substrate layer, the surface layer contains polyvinylidene fluoride and an inorganic material particle, and an amount of deformation against pressure of the surface layer is larger than that of the substrate layer.

19 Claims, 3 Drawing Sheets

(51) Int. Cl.
| | | |
|---|---|---|
| *H01M 4/58* | (2010.01) | |
| *H01M 10/052* | (2010.01) | |
| *H01M 10/0525* | (2010.01) | |
| *H01M 2/26* | (2006.01) | |
| *H01M 2/30* | (2006.01) | |
| *H01M 2/34* | (2006.01) | |
| *H01M 4/131* | (2010.01) | |
| *H01M 4/136* | (2010.01) | |
| *H01M 4/525* | (2010.01) | |
| *H01M 4/62* | (2006.01) | |
| *H01M 4/66* | (2006.01) | |
| *H01M 10/0568* | (2010.01) | |
| *H01M 10/0569* | (2010.01) | |
| *H01M 10/0587* | (2010.01) | |
| *H01M 2/02* | (2006.01) | |
| *H01M 4/02* | (2006.01) | |
| *B01D 53/22* | (2006.01) | |
| *H01M 4/04* | (2006.01) | |
| *H01M 4/1391* | (2010.01) | |
| *H01M 4/1397* | (2010.01) | |

(52) U.S. Cl.
CPC ......... *H01M 2/0287* (2013.01); *H01M 2/166* (2013.01); *H01M 2/1633* (2013.01); *H01M 2/1646* (2013.01); *H01M 2/1653* (2013.01); *H01M 2/26* (2013.01); *H01M 2/30* (2013.01); *H01M 2/348* (2013.01); *H01M 4/131* (2013.01); *H01M 4/136* (2013.01); *H01M 4/38* (2013.01); *H01M 4/386* (2013.01); *H01M 4/387* (2013.01); *H01M 4/525* (2013.01); *H01M 4/58* (2013.01); *H01M 4/623* (2013.01); *H01M 4/625* (2013.01); *H01M 4/661* (2013.01); *H01M 10/052* (2013.01); *H01M 10/0525* (2013.01); *H01M 10/0568* (2013.01); *H01M 10/0569* (2013.01); *H01M 10/0587* (2013.01); *B01D 53/22* (2013.01); *H01M 2/02* (2013.01); *H01M 4/02* (2013.01); *H01M 4/0404* (2013.01); *H01M 4/1391* (2013.01); *H01M 4/1397* (2013.01); *H01M 2004/027* (2013.01); *H01M 2004/028* (2013.01); *H01M 2200/106* (2013.01); *H01M 2220/30* (2013.01); *H01M 2300/0037* (2013.01); *Y02E 60/122* (2013.01)

(56) References Cited

U.S. PATENT DOCUMENTS

| | | | |
|---|---|---|---|
| 9,356,273 B2 * | 5/2016 | Sato | H01M 2/1633 |
| 2007/0178384 A1 | 8/2007 | Kajita et al. | |
| 2007/0190408 A1 | 8/2007 | Inoue et al. | |
| 2007/0190423 A1 * | 8/2007 | Ishii | C01B 31/04 429/231.8 |
| 2008/0038631 A1 | 2/2008 | Nakura et al. | |
| 2009/0197158 A1 | 8/2009 | Ogawa et al. | |
| 2010/0196750 A1 * | 8/2010 | Kajita | H01M 2/162 429/145 |
| 2010/0285371 A1 * | 11/2010 | Lee | H01M 2/145 429/247 |

FOREIGN PATENT DOCUMENTS

| | | | |
|---|---|---|---|
| CN | 101527371 | 9/2009 | |
| JP | 2003-086162 | 3/2003 | |
| JP | 2007-188777 | 7/2007 | |
| JP | 2007-220452 | 8/2007 | |
| JP | 2007-273443 | 10/2007 | |
| JP | 2008-186722 | 8/2008 | |
| JP | 2009-146610 | 7/2009 | |
| JP | 2009-266718 | 11/2009 | |
| WO | 2008/038971 | 4/2008 | |
| WO | WO 2008/038971 | * 4/2008 | H01M 2/14 |

OTHER PUBLICATIONS

Chinese Office Action dated Feb. 17, 2014 in corresponding Chinese Patent Application No. 201010573102.4.
Chinese Office Action dated Sep. 24, 2014 in corresponding Chinese Application No. 201010573102.4.
Chinese Office Action dated Jan. 13, 2015 in corresponding Chinese Application No. 201010573102.4.

* cited by examiner

NONAQUEOUS ELECTROLYTE SECONDARY BATTERY AND SEPARATOR

CROSS REFERENCE TO RELATED APPLICATIONS

The present application is a continuation of U.S. application Ser. No. 12/958,961, filed Dec. 2, 2010, which claims priority to Japanese Patent Application JP 2009-277072 filed on Dec. 4, 2009, the entire contents of which is hereby incorporated by reference.

BACKGROUND

The present disclosure relates to a nonaqueous electrolyte secondary battery and a separator.

In recent years, a number of portable electronic appliances such as a camera-integrated VTR, a digital still camera, a mobile phone, a personal digital assistant and a laptop computer have appeared, and it is contrived to achieve downsizing and weight reduction thereof. With respect to batteries, in particular, secondary batteries as a portable power source for such an electronic appliance, research and development have been actively conducted for the purpose of enhancing the energy density.

Above all, lithium ion secondary batteries utilizing intercalation and deintercalation of lithium for a charge and discharge reaction are widely put into practical use because a large energy density is obtained as compared with lead batteries and nickel-cadmium batteries which are a nonaqueous electrolytic solution secondary battery of the related art.

In these lithium ion secondary batteries, for the purpose of enhancing the battery capacity, it is proposed to use a negative electrode material including silicon or tin as a composing element as a negative electrode active material (see, for example, JP-A-2007-188777).

Also, in the lithium ion secondary batteries, a polyolefin separator having a shutdown function is widely used as an insulating material for preventing a short circuit between electrodes from occurring.

SUMMARY

However, in the lithium ion secondary batteries using based negative electrode material including silicon or tin as a composing element, a pressure generated due to expansion of the negative electrode active material at the time of charge is applied directly. In the case of using a polyolefin separator, since pores of the separator are collapsed by the pressure generated due to expansion of the negative electrode active material, ion permeability of the separator is lowered, so that a cycle characteristic is lowered.

Also, in the lithium ion secondary batteries using a polyolefin separator, the strength of the polyolefin separator is lowered upon being oxidized, or clogging of pores of the polyolefin separator is generated by an oxide, thereby causing a problem that battery characteristics are lowered.

In consequence, it is desirable to provide a nonaqueous electrolyte secondary battery capable of suppressing a lowering of battery characteristics such as a cycle characteristic and a separator.

According to an embodiment, there is provided a nonaqueous electrolyte secondary battery including a positive electrode, a negative electrode and a separator disposed between the positive electrode and the negative electrode, wherein the separator has a substrate layer and a surface layer formed on at least one principal plane of the substrate layer, the surface layer contains polyvinylidene fluoride and an inorganic material particle, and an amount of deformation against pressure of the surface layer is larger than that of the substrate layer.

According to another embodiment, there is provided a separator including a substrate layer and a surface layer formed on at least one principal plane of the substrate layer, wherein the surface layer contains polyvinylidene fluoride and an inorganic material particle, and an amount of deformation against pressure of the surface layer is larger than that of the substrate layer.

In the foregoing embodiments, the surface layer contains an inorganic material particle and polyvinylidene fluoride, and an amount of deformation against pressure of the surface layer is larger than that of the substrate layer. According to this, the matter that micropores of the substrate layer are collapsed by a pressure applied due to expansion of a negative electrode active material at the time of charge, resulting in a lowering of permeability can be prevented from occurring. Also, in view of the fact that the surface layer contains an inorganic material particle, oxidation resistance of the separator can be enhanced.

According to the embodiments, a lowering of battery characteristics such as a cycle characteristic can be suppressed.

Additional features and advantages are described herein, and will be apparent from the following Detailed Description and the figures.

DETAILED DESCRIPTION

Embodiments are hereunder described by reference to the accompanying drawings. The description is made in the following order.

1. First embodiment (first example of a nonaqueous electrolyte secondary battery)
2. Second embodiment (second example of a nonaqueous electrolyte secondary battery)
3. Third embodiment (third example of a nonaqueous electrolyte secondary battery)
4. Other embodiments (modification examples)

1. First Embodiment (Configuration of Nonaqueous Electrolyte Secondary Battery)

Figure 1:
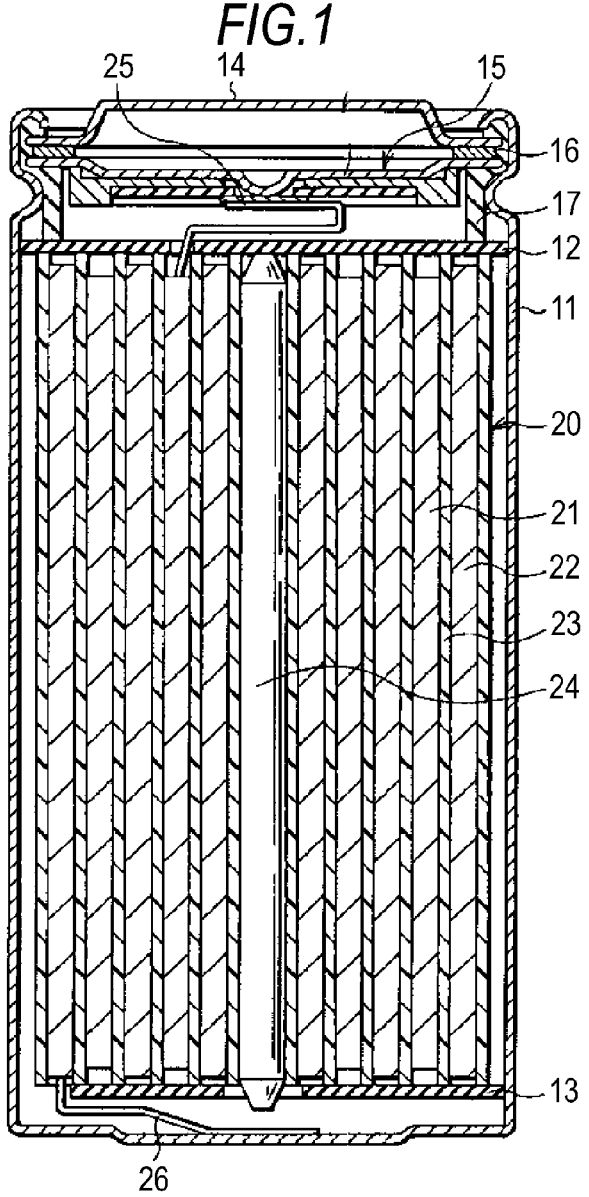
FIG. 1 is a sectional view showing a configuration example of a nonaqueous electrolyte secondary battery according to a first embodiment.
Figure 2:
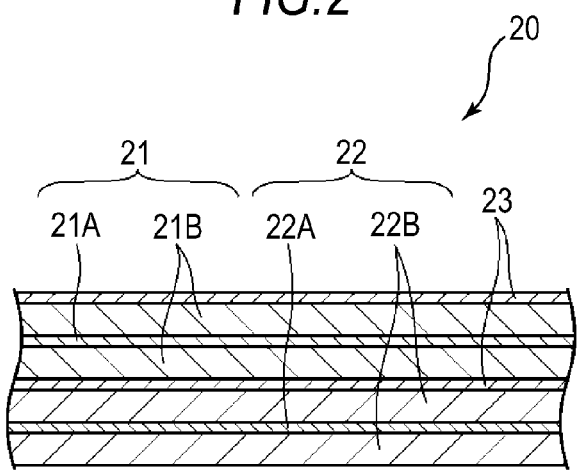
FIG. 2 is a sectional view enlargedly showing a part of a wound electrode body shown in FIG. 1.

A nonaqueous electrolyte secondary battery according to a first embodiment is described by reference to FIGS. 1 and 2. FIG. 1 shows a sectional configuration of a nonaqueous electrolyte secondary battery according to the first embodiment. FIG. 2 enlargedly shows a wound electrode body 20 shown in FIG. 1. The secondary battery as described herein is, for example, a lithium ion secondary battery in which a capacity of a negative electrode 22 is expressed on the basis of intercalation and deintercalation of lithium which is an electrode reactant.

This nonaqueous electrolyte secondary battery is one in which a wound electrode body 20 in which a positive electrode 21 and a negative electrode 22 are laminated via a and wound and a pair of insulating plates 12 and 13 are mainly housed in the inside of a battery can 11 in a substantially hollow column shape. The battery structure using this columnar battery can 11 is called a cylindrical type.

(Positive Electrode)

The positive electrode 21 is, for example, one in which a positive electrode active material layer 21B is provided on the both surfaces of a positive electrode collector 21A having a pair of surfaces. However, the positive electrode active material layer 21B may be provided on only one surface of the positive electrode collector 21A.

The positive electrode collector 21A is constituted of a metal material, for example, aluminum, nickel, stainless steel, etc.

The positive electrode active material layer 21B contains, as a positive electrode active material, one kind or two or more kinds of positive electrode materials capable of intercalating and deintercalating lithium and may further contain other materials such as a binder and a conductive agent, if desired.

As the positive electrode material capable of intercalating and deintercalating lithium, for example, a lithium-containing compound is preferable. This is because a high energy density is obtained. Examples of this lithium-containing compound include a complex oxide containing lithium and a transition metal element and a phosphate compound containing lithium and a transition metal element. Of these, a compound containing at least one member selected from the group consisting of cobalt, nickel, manganese and iron as the transition metal element is preferable. This is because a higher voltage is obtained. A chemical formula thereof is represented by, for example, $Li_xM1O_2$ ($0.05<x<1.10$) or $Li_yM2PO_4$ ($0.05<y<1.10$) In the formulae, each of M1 and M2 represents one or more kinds of transition metal elements.

Examples of the complex oxide containing lithium and a transition metal element include a lithium cobalt complex oxide ($Li_xCoO_2$ ($0.05<x<1.10$)), a lithium nickel complex oxide ($Li_xNiO_2$ ($0.05<x<1.10$)), a lithium nickel cobalt complex oxide ($Li_xNi_{1-z}Co_zO_2$ ($0.05<x<1.10$, $0<z<1$)), a lithium nickel cobalt manganese complex oxide ($Li_xNi_{(1-v-w)}Co_vMn_wO_2$ ($0.05<x<1.10$, $0<v<1$, $0<w<1$, $0<(v+w)<1$)), a lithium nickel cobalt aluminum complex oxide ($Li_xNi_{(1-v-w)}Co_vAl_wO_2$ ($0.05<x<1.10$, $0<v<1$, $0<w<1$, $0<(v+w)<1$)) and a lithium manganese complex oxide having a spinel type structure ($LiMn_2O_4$). Of these, cobalt-containing complex oxides are preferable. This is because not only a high capacity is obtained, but an excellent cycle characteristic is obtained. Also, examples of the phosphate compound containing lithium and a transition metal element include a lithium iron phosphate compound ($LiFePO_4$) and a lithium iron manganese phosphate compound ($LiFe_{1-u}Mn_uPO_4$ ($0<u<1$)).

Besides, examples of the positive electrode material capable of intercalating and deintercalating lithium include oxides such as titanium oxide, vanadium oxide and manganese dioxide; disulfides such as titanium disulfide and molybdenum sulfide; chalcogenides such as niobium selenide; sulfur; and conductive polymers such as polyaniline and polythiophene.

The positive electrode material capable of intercalating and deintercalating lithium may be other material than those described above. Also, the above-exemplified positive electrode materials may be a mixture of two or more kinds thereof in an arbitrary combination.

Examples of the binder include synthetic rubbers such as a styrene butadiene based rubber, a fluorocarbon based rubber and an ethylene propylene diene based rubber; and polymer materials such as polyvinylidene fluoride. These materials may be used singly or in admixture of plural kinds thereof.

Examples of the conductive agent include carbon materials such as graphite and carbon blacks such as acetylene black and ketjen black. These materials are used singly or in admixture of plural kinds thereof. The positive electrode conductive agent may be a metal material or a conductive polymer material or the like so far as it is a material having conductivity.

(Negative Electrode)

The negative electrode 22 is, for example, one in which a negative electrode active material layer 22B is provided on the both surfaces of a negative electrode collector 22A having a pair of surfaces. However, the negative electrode active material layer 22B may be provided on only one surface of the negative electrode collector 22A.

The negative electrode collector 22A is constituted of a metal material, for example, copper, nickel, stainless steel, etc.

The negative electrode active material layer 22B contains, as a negative electrode active material, one kind or two or more kinds of negative electrode materials capable of intercalating and deintercalating lithium and may contain other materials such as a binder and a conductive agent, if desired. As the binder and the conductive agent, the same materials as those described above with respect to the positive electrode can be used.

Examples of the negative electrode material capable of intercalating and deintercalating lithium include carbon materials. Examples of such a carbon material include easily graphitized carbon, hardly graphitized carbon with a (002) plane interval of 0.37 nm or more and graphite with a (002) plane interval of not more than 0.34 nm More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtained, an excellent cycle characteristic is obtained, and furthermore, the carbon material also functions as a conductive agent. The shape of the carbon material may be any of a fibrous shape, a spherical shape, a granular shape or a flaky shape.

In addition to the foregoing carbon materials, examples of the negative electrode material capable of intercalating and deintercalating lithium include a material capable of intercalating and deintercalating lithium and containing, as a constituent element, at least one member selected from the group consisting of metal elements and semi-metal elements. This is because a high energy density is obtained.

Such a negative electrode material may be a simple substance, alloy or compound of a metal element or a semi-metal element. Also, a material having one kind or two or more kinds of phases in at least a part thereof may be used. The "alloy" as referred to herein includes, in addition to alloys composed of two or more kinds of metal elements, alloys containing one or more kinds of metal elements and one or more kinds of semi-metal elements. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a metal element or a semi-metal element capable of forming an alloy together with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Of these, at least one member selected from silicon and tin is preferable, and silicon is more preferable. This is because silicon and tin have large capability to intercalate and deintercalate lithium, so that a high energy density is obtained.

Examples of the negative electrode material containing at least one member selected from silicon and tin include a simple substance, alloy or compound of silicon; a simple substance, an alloy or a compound of tin; and a material having one kind or two or more kinds of phases in at least a part thereof.

Examples of alloys of silicon include alloys containing, as a second constituent element other than silicon, at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of silicon or compounds of tin include compounds containing oxygen (O) or carbon (C), and these compounds may further contain the foregoing second constituent element in addition to silicon (Si) or tin (Sn).

As the negative electrode material containing at least one member selected from silicon (Si) and tin (Sn), for example, a material containing tin (Sn) as a first constituent element and in addition to this tin (Sn), a second constituent element and a third constituent element is especially preferable. As a matter of course, this negative electrode material may be used together with the foregoing negative electrode material. The second constituent element is at least one member selected from the group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si). The third constituent element is at least one member selected from the group consisting of boron (B), carbon (C), aluminum (Al) and phosphorus (P). This is because when the second constituent element and the third constituent element are contained, the cycle characteristic is enhanced.

Above of all, the negative electrode material is preferably an SnCoC-containing material containing tin (Sn), cobalt (Co) and carbon (C) as constituent elements and having a content of carbon (C) in the range of 9.9% by mass or more and not more than 29.7% by mass and a proportion of cobalt (Co) to the total sum of tin (Sn) and cobalt (Co) (Co/(Sn+Co)) in the range of 30% by mass or more and not more than 70% by mass. This is because in the foregoing composition range, not only a high energy density is obtained, but an excellent cycle characteristic is obtained.

This SnCoC-containing material may further contain other constituent elements, if desired. As other constituent elements, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) and bismuth (Bi) are preferable. The SnCoC-containing material may contain two or more kinds of these elements. This is because the capacity characteristic or cycle characteristic is more enhanced.

The SnCoC-containing material has a phase containing tin (Sn), cobalt (Co) and carbon (C), and this phase preferably has a lowly crystalline or amorphous structure. Also, in the SnCoC-containing material, it is preferable that at least a part of carbon as the constituent element is bound to a metal element or a semi-metal element as other constituent element. This is because though it may be considered that a lowering of the cycle characteristic is caused due to aggregation or crystallization of tin (Sn) or the like, when carbon is bound to other element, such aggregation or crystallization is suppressed.

Examples of a measurement method for examining the binding state of elements include X-ray photoelectron spectroscopy (XPS). In this XPS, so far as graphite is concerned, a peak of the is orbit (Cis) of carbon appears at 284.5 eV in an energy-calibrated apparatus such that a peak of the 4f orbit of a gold atom (Au4f) is obtained at 84.0 eV. Also, so far as surface contamination carbon is concerned, a peak of the is orbit (Cis) of carbon appears at 284.8 eV. On the contrary, in the case where a charge density of the carbon element is high, for example, in the case where carbon is bound to a metal element or a semi-metal element, the peak of C1s appears in a lower region than 284.5 eV. That is, in the case where a peak of a combined wave of C1s obtained regarding the SnCoC-containing material appears in a lower region than 284.5 eV, at least a part of carbon (C) contained in the SnCoC-containing material is bound to a metal element or a semi-metal element as other constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software. In the analysis of the waveform, the position of a main peak existing on the side of lowest binding energy is used as an energy reference (284.8 eV).

Also, examples of the negative electrode material capable of intercalating and deintercalating lithium include metal oxides and polymer compounds, each of which is capable of intercalating and deintercalating lithium. Examples of the metal oxide include iron oxide, ruthenium oxide and molybdenum oxide; and examples of the polymer compound include polyacetylene, polyaniline and polypyrrole.

The negative electrode material capable of intercalating and deintercalating lithium may be other material than those described above. Also, the foregoing negative electrode material may be a mixture of two or more kinds thereof in an arbitrary combination.

The negative electrode active material layer 22B may be, for example, formed by any of a vapor phase method, a liquid phase method, a spraying method, a baking method or a coating method, or a combined method of two or more kinds of these methods. In the case where the negative electrode active material layer 22B is formed by adopting a vapor phase method, a liquid phase method, a spraying method, a baking method or a combined method of two or more kinds of these methods, it is preferable that the negative electrode active material layer 22B and the negative electrode collector 22A are alloyed on at least a part of an interface therebetween. Specifically, it is preferable that on the interface, the constituent elements of the negative electrode collector 22A are diffused into the negative electrode active material layer 22B, the constituent elements of the negative electrode active material layer 22B are diffused into the negative electrode collector 22A, or these constituent elements are mutually diffused into each other. This is because not only breakage to be caused due to expansion and shrinkage of the negative electrode active material layer 22B following the charge and discharge can be suppressed, but electron conductivity between the negative electrode active material layer 22B and the negative electrode collector 22A can be enhanced.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and electroless plating can be adopted. The baking method as referred to herein is, for example, a method in which after a granular negative electrode active material is mixed with a binder and the like, the mixture is dispersed in a solvent and coated, and the coated material is then heat treated at a higher temperature than a melting point of the binder, etc. As to the baking method, known techniques can be utilized, too, and examples thereof include an atmospheric baking method, a reaction baking method and a hot press baking method.

(Separator)

Figure 3:
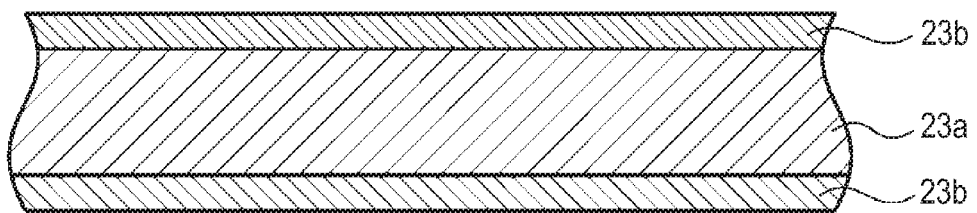
FIG. 3 is a sectional view showing a configuration example of a separator.

FIG. 3 is a sectional view showing a configuration example of the separator 23. The separator 23 partitions the positive electrode 21 and the negative electrode 22 from each other and allows a lithium ion to pass therethrough while preventing a short circuit of the current to be caused due to the contact between the both electrodes. As shown in FIG. 3, the separator 23 is provided with a substrate layer 23a and a surface layer 23b formed on at least one of the both principal planes of the substrate layer 23a. FIG. 3 shows an example in which the surface layer 23b is formed on the both principal planes of the substrate layer 23a.

(Substrate Layer 23a)

The substrate layer 23a is, for example, a microporous film composed mainly of a polymer resin. It is preferable to use a polyolefin based resin as the polymer resin. This is because the microporous film composed mainly of a polyolefin has an excellent short-circuit preventing effect and is able to contrive to enhance safety of the battery due to a shutdown effect. It is preferable to use polypropylene or polyethylene singly or in admixture as the polyolefin based resin. Also, in addition to polypropylene and polyethylene, other resins can be used upon being copolymerized or mixed with polyethylene or polypropylene, so far as they are a resin provided with chemical stability.

(Surface layer 23b)

The surface layer 23b contains an inorganic material particle and polyvinylidene fluoride. The surface layer 23b has higher cushioning properties than the substrate layer 23a. That is, in the case where the same pressure is applied from a thickness direction, an amount of deformation of the surface layer 23b is larger than that of the substrate layer 23a. A pressure to be applied due to expansion of the negative electrode active material layer 22B at the time of charge is absorbed by the surface layer 23b with high cushioning properties. According to this, the matter that micropores of the substrate layer 23a are collapsed by a pressure applied due to expansion of the negative electrode active material layer 22B at the time of charge, resulting in a lowering of permeability can be prevented from occurring. It may be considered that such high cushioning properties of the surface layer 23b are obtained by elasticity of polyvinylidene fluoride, voids by a structure of polyvinylidene fluoride or voids formed between the inorganic material particle and polyvinylidene fluoride formed upon being mixed with the inorganic material particle.

Polyvinylidene fluoride is, for example, fibrillated. The surface layer 23b has a three-dimensional network structure in which fibrils made of polyvinylidene fluoride as a component are continuously connected with each other. An average diameter of the fibril is, for example, not more than 1.5 µm.

(Inorganic Material Particle)

For example, the inorganic material particle is preferably an inorganic oxide particle having electrically insulating properties. It is preferable to use a particle composed mainly of an inorganic oxide, for example, alumina ($Al_2O_3$), silica, etc. as the inorganic oxide particle. The oxidation resistance of the separator 23 can be enhanced by the inorganic material particle.

(Particle Size)

It is preferable that an average particle size of the inorganic material particle is not more than 50% relative to the thickness of the surface layer 23b. This is because in the case where the average particle size of the inorganic material particle is too large, a lowering of the amount of deformation against pressure of the surface layer 23b, namely a lowering of the cushioning properties is generated. The average particle size is an average particle size (D50) measured by the laser diffraction scattering method.

(Porosity of Surface Layer)

A porosity of the surface layer 23b is preferably 20% or more and not more than 90%. This is because when the porosity is less than 20%, the cushioning properties are lowered, whereas when the porosity is more than 90%, there is a concern that binding properties of the particle are lowered, so that the inorganic layer is separated. It is possible to properly regulate the porosity of the surface layer 23b by adjusting the content of the inorganic material particle, adjusting the particle size of the inorganic material particle or adjusting the solids content of the inorganic material particle slurry, or other means. The porosity can be calculated by calculating a theoretical volume density from a density of polyvinylidene fluoride and a density of the inorganic material particle and determining a measured volume density of a subject relative to that density.

(Forming Method of Surface Layer)

As to a forming method of this surface layer 23b, for example, the surface layer 23b can be formed by coating a slurry composed of a solvent and an inorganic material particle on the substrate layer 23a and allowing the substrate layer 23a to pass through a solvent which is a poor solvent against polyvinylidene fluoride and a solvophilic solvent against the foregoing solvent to undergo phase separation, followed by drying. Also, for example, the surface layer 23b can be formed by coating a slurry composed of polyvinylidene fluoride, a solvent and an inorganic material particle on the substrate layer 23a and then drying it without undergoing phase separation.

(Electrolytic Solution)

The separator 23 is impregnated with an electrolytic solution which is a liquid electrolyte. This electrolytic solution contains a solvent and an electrolyte salt dissolved in this solvent.

A cyclic carbonate ester such as ethylene carbonate and propylene carbonate can be used as the solvent. It is preferable to use one of ethylene carbonate and propylene carbonate, especially both of them as the solvent. This is because the cycle characteristic can be enhanced.

Also, it is preferable to use, as the solvent, a mixture of a chain carbonate such as diethyl carbonate, dimethyl carbonate, ethyl methyl carbonate and methyl propyl carbonate in addition to such a cyclic carbonate. This is because the cycle characteristic can be enhanced.

Moreover, it is preferable that the solvent further contains 2,4-difluoroanisole or vinylene carbonate. This is because 2,4-difluoroanisole is able to enhance the discharge capacity; and vinylene carbonate is able to more enhance the cycle characteristic. Accordingly, the use of a mixture of these materials is preferable because both the discharge capacity and the cycle characteristic can be enhanced.

Besides, examples of other solvents include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, N,N-dimethylimidazolidinone, nitromethane, nitroethane, sulfolane, dimethyl sulfoxide and trimethyl phosphate.

There may be the case where a compound in which at least a part of hydrogen of such a nonaqueous solvent is substituted with fluorine is preferable because it may possibly enhance reversibility of an electrode reaction depending upon the kind of an electrode to be combined. Examples of such a compound include 4-fluoro-1,3-dioxolan-2-one (FEC) and 4,5-difluoro-1,3-dioxolan-2-one (DFEC).

Examples of the electrolyte salt include lithium salts, and the lithium salt may be used singly or in admixture of two or more kinds thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxalate-O,O']borate, LiBOB (lithium bisoxalate borate) and LiBr. Above all, $LiPF_6$ is preferable because not only high ionic conductivity can be obtained, but the cycle characteristic can be enhanced.

(Manufacturing Method of Nonaqueous Electrolyte Secondary Battery)

A manufacturing method of the foregoing nonaqueous electrolyte secondary battery is described.

(Manufacture of Positive Electrode)

First, the positive electrode 21 is fabricated. A positive electrode active material, a positive electrode binder and a positive electrode conductive agent are mixed to form a positive electrode mixture, which is then dispersed in an organic solvent to form a positive electrode mixture slurry in a paste form. Subsequently, the positive electrode mixture slurry is uniformly coated on the both surfaces of the positive electrode collector 21A by a doctor blade or a bar coater or the like and then dried. Finally, the coating film is subjected to compression molding by a roll press or the like while heating, if desired, thereby forming the positive electrode active material layer 21B. In that case, the compression molding may be repeatedly carried out plural times.

(Manufacture of Negative Electrode)

Next, the negative electrode 22 is fabricated. First of all, the negative electrode collector 22A made of an electrolytic copper foil or the like is prepared, and a negative electrode material is then deposited on the both surfaces of the electrode collector 22A by a vapor phase method such as a vapor deposition method, thereby forming plural negative electrode active material particles. Thereafter, if desired, an oxide-containing film is formed by a liquid phase method such as a liquid phase deposition method, or a metal material is formed by a liquid phase method such as an electrolytic plating method, or the both are formed, thereby forming the negative electrode active material layer 22B.

Also, the negative electrode 22 may be fabricated according to the same procedures as in the positive electrode 21. That is, first of all, a negative electrode material and a negative electrode binder and optionally, a negative electrode conductive agent are mixed to form a negative electrode mixture, which is then dispersed in an organic solvent to form a negative electrode mixture slurry in a paste form. Subsequently, the negative electrode mixture slurry is uniformly coated on the both surfaces of the negative electrode collector 22A by a doctor blade or a bar coater or the like and then dried. Finally, the coating film is subjected to compression molding by a roll press or the like while heating, if desired, thereby forming the negative electrode active material layer 22B.

(Assembling of Battery)

Assembling of the nonaqueous electrolyte secondary battery is carried out in the following manner First of all, a positive electrode lead 25 is installed in the positive electrode collector 21A by means of welding, etc., and a negative electrode lead 26 is also installed in the negative electrode collector 22A by means of welding, etc. Subsequently, the positive electrode 21 and the negative electrode 22 are laminated via the separator 23 and wound to fabricate the wound electrode body 20, and a center pin 24 is then inserted on the winding center thereof. Subsequently, the wound electrode body 20 is housed in the inside of the battery can 11 while being interposed between a pair of the insulating plates 12 and 13; and a tip end of the positive electrode lead 25 is welded with a safety valve mechanism 15, whereas a tip end of the negative electrode lead 26 is welded with the battery can 11.

Subsequently, an electrolytic solution is injected into the inside of the battery can 11 and impregnated in the separator 23. Finally, a battery lid 14, the safety valve mechanism 15 and a positive temperature coefficient (PTC) device 16 are fixed to the open end of the battery can 11 upon being caulked via a gasket 17. There is thus completed the nonaqueous electrolyte secondary battery shown in FIGS. 1 and 2.

In this nonaqueous electrolyte secondary battery, for example, when charged, a lithium ion is deintercalated from the positive electrode 21 and intercalated in the negative electrode 22 via the electrolytic solution impregnated in the separator 23. On the other hand, for example, when discharged, the lithium ion is deintercalated from the negative electrode 22 and intercalated in the positive electrode 21 via the electrolytic solution impregnated in the separator 23.

In this nonaqueous electrolyte secondary battery, from the standpoint of realizing a high capacity, it is preferable that the negative electrode 22 contains a material capable of intercalating and deintercalating lithium and having at least one member selected from a metal element and a semi-metal element, such as silicon and tin.

At that time, though the pressure applied to the separator 23 becomes large due to expansion of the negative electrode 22 at the time of charge, the pressure can be absorbed by the surface layer 23b with high cushioning properties, so that a lowering of the battery characteristics such as a cycle characteristic can be suppressed.

<Effect>

In the nonaqueous electrolyte secondary battery according to this first embodiment, the surface layer 23b of the separator 23 contains an inorganic material particle and polyvinylidene fluoride, and an amount of deformation against pressure of the surface layer 23b is larger than that of the substrate layer 23a. The pressure applied to the separator 23 due to expansion of the negative electrode 22 at the time of charge is absorbed by the surface layer 23b. According to this, micropores of the substrate layer 23a are collapsed by the pressure applied due to expansion of the negative electrode 22 at the time of charge, so that a lowering of ion permeability can be prevented from occurring. Also, in view of the fact that the surface layer 23a contains an inorganic material particle, the oxidation resistance of the separator 23 can be enhanced. According to this, since the matter that a lowering of the strength to be caused due to oxidation of the separator 23 can be suppressed, the lowering of the battery characteristics can be suppressed.

2. Second Embodiment (Configuration of Nonaqueous Electrolyte Secondary Battery)

Figure 4:
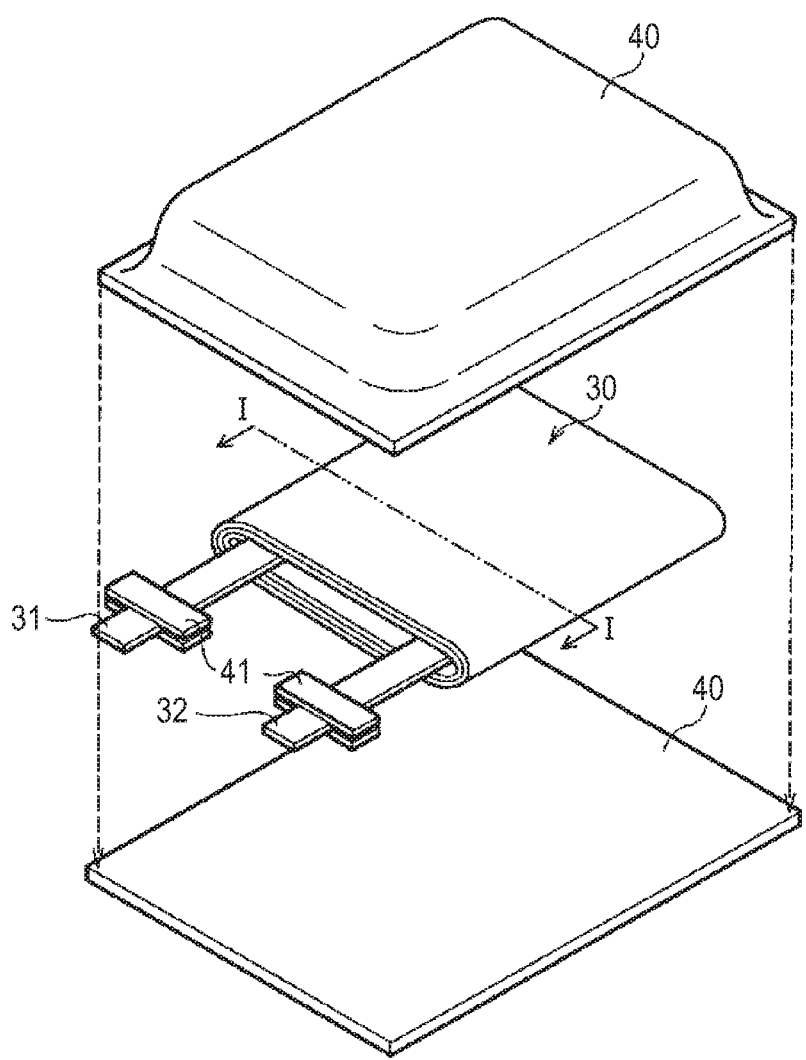
FIG. 4 is an exploded perspective view showing a configuration example of a nonaqueous electrolyte secondary battery according to a second embodiment.

A nonaqueous electrolyte secondary battery according to a second embodiment is described. FIG. 4 expresses an exploded perspective configuration of a nonaqueous electrolyte secondary battery according to the second embodiment; and FIG. 5 enlargedly shows a section along an I-I line of a wound electrode body 30 shown in FIG. 4.

This nonaqueous electrolyte secondary battery is, for example, a lithium ion secondary battery similar to the nonaqueous electrolyte secondary battery according to the first embodiment and is chiefly one in which a wound electrode body 30 having a positive electrode lead 31 and a negative electrode lead 32 installed therein is housed in the inside of an exterior member 40 in a film form. The battery structure using this exterior member 40 in a film form is called a laminated film type.

The positive electrode lead 31 and the negative electrode lead 32 are each led out in, for example, the same direction from the inside toward the outside of the exterior member 40. The positive electrode lead 31 is constituted of a metal material, for example, aluminum, etc., and the negative electrode lead 32 is constituted of a metal material, for example, copper, nickel, stainless steel, etc. Such a metal material is, for example, formed in a thin plate state or a network state.

The exterior member 40 is constituted of, for example, an aluminum laminated film obtained by sticking a nylon film, an aluminum foil and a polyethylene film in this order. For example, this exterior member 40 has a structure in which respective outer edges of the two rectangular aluminum laminated films are allowed to adhere to each other by means of fusion or with an adhesive such that the polyethylene film is disposed opposing to the wound electrode body 30.

A contact film 41 is inserted between the exterior member 40 and each of the positive electrode lead 31 and the negative electrode lead 32 for the purpose of preventing invasion of the outside air. This contact film 41 is constituted of a material having adhesion to each of the positive electrode lead 31 and the negative electrode lead 32. Examples of such a material include polyolefin resins such as polyethylene, polypropylene, modified polyethylene and modified polypropylene.

The exterior member 40 may be constituted of a laminated film having other lamination structure, or constituted of a polymer film such as polypropylene or a metal film, in place of the foregoing aluminum laminated film.

Figure 5:
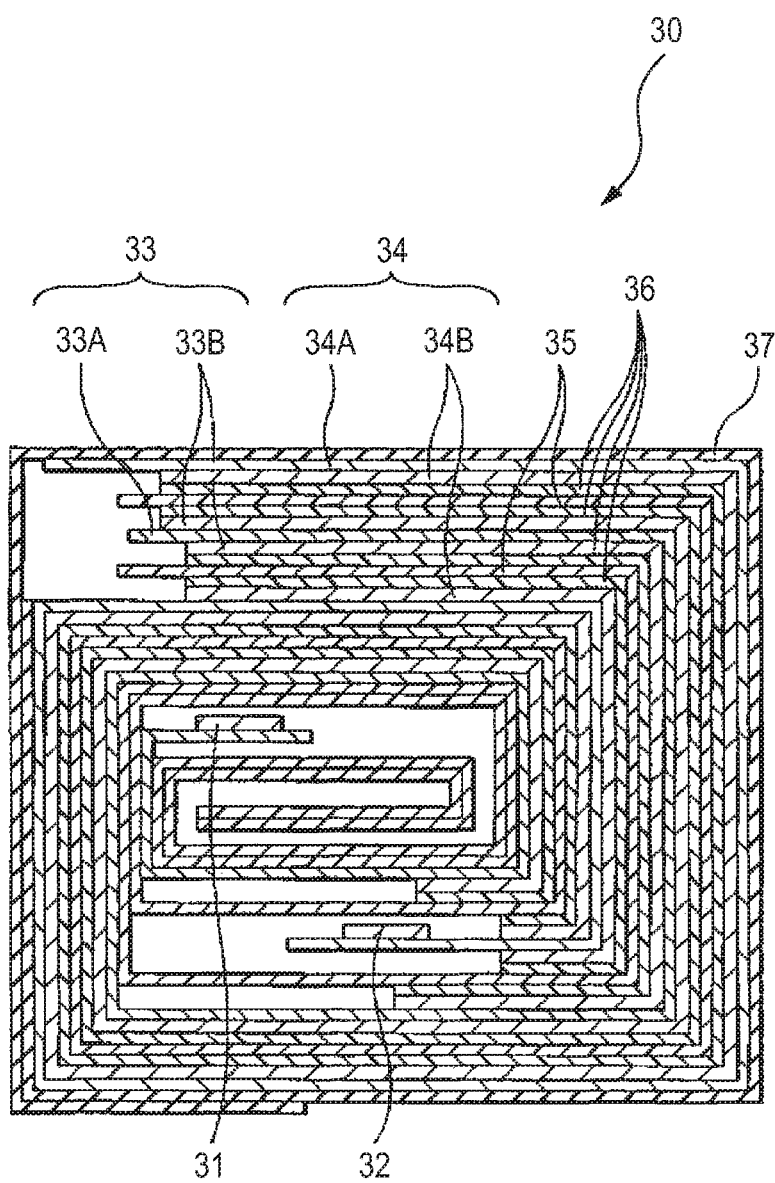
FIG. 5 is a sectional view along an I-I line of a wound electrode body in FIG. 4.

FIG. 5 shows a sectional configuration along an I-I line of the wound electrode body 30 shown in FIG. 4. This wound electrode body 30 is one prepared by laminating a positive electrode 33 and a negative electrode 34 via a separator 35 and an electrolyte 36 and winding the laminate, and an outermost peripheral part thereof is protected by a protective tape 37.

The positive electrode 33 is one in which a positive electrode active material layer 33B is provided on the both surfaces of a positive electrode collector 33A. The negative electrode 34 is, for example, one in which a negative electrode active material layer 34B is provided on the both surfaces of a negative electrode collector 34A, and the negative electrode active material layer 34B is disposed opposing to the positive electrode active material layer 33B. Configurations of the positive electrode collector 33A, the positive electrode active material layer 33B, the negative electrode collector 34A, the negative electrode active material layer 34B and the separator 35 are the same as those of the positive electrode collector 21A, the positive electrode active material layer 21B, the negative electrode collector 22A, the negative electrode active material layer 22B and the separator 23 in the first embodiment, respectively.

The electrolyte 36 is an electrolyte in a so-called gel form, which contains an electrolytic solution and a polymer compound for holding it therein. The electrolyte in a gel form is preferable because not only high ionic conductivity (for example, 1 mS/cm or more at room temperature) is obtained, but the liquid leakage is prevented.

Examples of the polymer compound include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. These compounds may be used singly or in admixture of plural kinds thereof. Of these, from the standpoint of electrochemical stability, it is preferable to use polyacrylonitrile, polyvinylidene fluoride, polyhexafluoropropylene or polyethylene oxide.

(Manufacturing Method of Nonaqueous Electrolyte Secondary Battery)

This nonaqueous electrolyte secondary battery is, for example, manufactured in the following manner.

First of all, for example, the positive electrode active material layer 33B is formed on the both surface of the positive electrode collector 33A by the same fabrication procedures as those of the positive electrode 21 and the negative electrode 22 according to the foregoing first embodiment, thereby fabricating the positive electrode 33. Also, the negative electrode active material layer 34B is formed on the both surfaces of the negative electrode collector 34A, thereby fabricating the negative electrode 34.

Subsequently, a precursor solution containing an electrolytic solution, a polymer compound and a solvent is prepared and coated on each of the positive electrode 33 and the negative electrode 34, and the solvent is then vaporized to form the electrolyte 36 in a gel form. Subsequently, the positive electrode lead 31 is installed in the positive electrode collector 33A, and the negative electrode lead 32 is also installed in the negative electrode collector 34A.

Subsequently, the positive electrode 33 and the negative electrode 34 each having the electrolyte 36 formed therein are laminated via the separator 35, the laminate is then wound in a longitudinal direction thereof, and the protective tape 37 is allowed to adhere to an outermost peripheral part thereof, thereby fabricating the wound electrode body 30. Finally, for example, the wound electrode body 30 is interposed between the two exterior members 40 in a film form, and the outer edges of the exterior members 40 are allowed to adhere to each other by means of heat fusion, etc., thereby sealing the wound electrode body 30 therein. On that occasion, the contact film 41 is inserted between each of the positive electrode lead 31 and the negative electrode lead 32 and the exterior member 40. There is thus completed the nonaqueous electrolyte secondary battery shown in FIGS. 4 and 5.

Also, this nonaqueous electrolyte secondary battery may be manufactured in the following manner First of all, for example, the positive electrode lead 31 is installed in the positive electrode 33, and the negative electrode lead 32 is also installed in the negative electrode 34. Subsequently, the positive electrode 33 and the negative electrode 34 are laminated via the separator 35 and wound, and the protective tape 37 is then allowed to adhere to an outermost peripheral part of the resulting laminate, thereby fabricating a wound body which is a precursor of the wound electrode body 30.

Subsequently, the wound body is interposed between the two exterior members 40 in a film form, and the outer edges exclusive of one side are allowed to adhere to each other by means of heat fusion, etc., thereby housing the wound body in the inside of the exterior member 40 in a bag form. Subsequently, an electrolyte composition containing an electrolytic solution, a monomer as a raw material of the polymer compound and a polymerization initiator and optionally, other materials such as a polymerization inhibitor is prepared and injected into the inside of the exterior member 40 in a bag form. Thereafter, an opening of the exterior member 40 is hermetically sealed by means of heat fusion, etc. Finally, the monomer is heat polymerized to form a polymer compound, thereby forming the electrolyte 36 in a gel form. There is thus completed the nonaqueous electrolyte secondary battery shown in FIGS. 4 and 5.

<Effect>

The second embodiment gives rise to the same effect as that in the first embodiment.

3. Third Embodiment

A nonaqueous electrolyte secondary battery according to a third embodiment is described. The nonaqueous electrolyte secondary battery according to the third embodiment is the same as the nonaqueous electrolyte secondary battery according to the second embodiment, except that the electrolytic solution is used as it is, in place of the electrolyte solution held on a polymer compound (the electrolyte 36). In consequence, its configuration is hereunder described in detail centering on points different from those in the second embodiment.

(Configuration of Nonaqueous Electrolyte Secondary Battery)

In the nonaqueous electrolyte secondary battery according to the third embodiment, an electrolytic solution is used in place of the electrolyte 36 in a gel form. In consequence, the wound electrode body 30 has a configuration in which the electrolyte 36 is omitted, and the electrolytic solution is impregnated in the separator 35.

(Manufacturing Method of Battery)

This nonaqueous electrolyte secondary battery is, for example, manufactured in the following manner.

First, for example, a positive electrode active material, a binder and a conductive agent are mixed to prepare a positive electrode mixture, which is then dispersed in a solvent such as N-methyl-2-pyrrolidone to prepare a positive electrode mixture slurry. Next, this positive electrode mixture slurry is coated on the both surfaces of the positive electrode collector 33A, dried and then subjected to compression molding to form the positive electrode active material layer 33B, thereby fabricating the positive electrode 33. Next, for example, the positive electrode lead 31 is connected with the positive electrode collector 33A by means of, for example, ultrasonic welding, spot welding, etc.

Also, for example, a negative electrode material and a binder are mixed to prepare a negative electrode mixture, which is then dispersed in a solvent such as N-methyl-2-pyrrolidone to prepare a negative electrode mixture slurry. Next, this negative electrode mixture slurry is coated on the both surfaces of the negative electrode collector 34A, dried and then subjected to compression molding to form the negative electrode active material layer 34B, thereby fabricating the negative electrode 34. Next, for example, the negative electrode lead 32 is connected with the negative electrode collector 34A by means of, for example, ultrasonic welding, spot welding, etc.

Subsequently, the positive electrode 33 and the negative electrode 34 are wound via the separator 35 and interposed in the inside of the exterior member 40, and an electrolytic solution is then injected into the inside of the exterior member 40, followed by hermetically sealing the exterior member 40. According to this, the nonaqueous electrolyte secondary battery shown in FIGS. 4 and 5 is obtained.

<Effect>

The third embodiment gives rise to the same effects as that in the first embodiment.

EXAMPLES

In the following Examples, the porosity of each of polymer resin films of the substrate and the surface layer and so on is one measured in the following manner.

(Measurement of Porosity)

The porosity was determined according to the following expression. That is, the porosity was measured by determining a theoretical volume density from a density of a material and comparing it with a volume density of a subject.

Porosity [%]={(Measured volume density)/(Theoretical volume density)}×100

Example 1

In Example 1, by using a polyethylene microporous film which is used as the substrate of the separator according to an embodiment and a film containing an alumina inorganic material particle and made of polyvinylidene fluoride (PVdF), which is used as the surface layer of the separator according to an embodiment, a change in the film thickness is measured in the case of vertically applying a prescribed pressure.

<Sample 1-1>

Molten polyethylene was eluted and biaxially stretched to form a polyethylene microporous film having a number of fine pores formed therein. At that time, the polyethylene microporous film was formed so as to have a thickness of 23 μm and a porosity of 60%.

<Sample 1-2>

A slurry prepared by dissolving polyvinylidene fluoride (PVdF) in N-methyl-2-pyrrolidone (NMP) and dispersing an alumina particle in the solution in a mass ratio of 10/1 (PVdF/alumina particle) was coated on a substrate and dried at 80° C. to form an alumina-containing polyvinylidene fluoride film. At that time, the polyvinylidene fluoride film was prepared so as to have a thickness of 23 μm and a porosity of 10%.

<Sample 1-3>

A slurry prepared by dissolving polyvinylidene fluoride (PVdF) in N-methyl-2-pyrrolidone (NMP) and dispersing an alumina particle in the solution in a mass ratio of 10/1 (PVdF/alumina particle) was coated on a substrate, washed with water and then dried at 70° C. to form an alumina-containing polyvinylidene fluoride film. At that time, the polyvinylidene fluoride film was prepared so as to have a thickness of 23 μm and a porosity of 20%.

<Sample 1-4>

A slurry prepared by dissolving polyvinylidene fluoride (PVdF) in N-methyl-2-pyrrolidone (NMP) and dispersing an alumina particle in the solution in a mass ratio of 1/20 (PVdF/alumina particle) was coated on a substrate, washed with water and then dried at 70° C. to form an alumina-containing polyvinylidene fluoride film. At that time, the polyvinylidene fluoride film was prepared so as to have a thickness of 23 μm and a porosity of 60%.

[Measurement of Amount of Deformation]

A pressure of 1 [kgf/cm$^2$] was vertically applied to each of the polyethylene microporous film of Sample 1-1 and the alumina-containing polyvinylidene fluoride films of Samples 1-2 to 1-4, and an amount of deformation of the film thickness at the time of applying a pressure was measured. The pressure was applied by pressing a metal rod.

<Sample 1-5>

A polyethylene microporous film was fabricated in the same manner as in Sample 1-1.

[Measurement of Amount of Deformation]

An amount of deformation of the film thickness at the time of vertically applying a pressure of 5 [kgf/cm$^2$] during the measurement of a displacement of the film thickness was measured.

<Samples 1-6 to 1-8>

Alumina-containing polyvinylidene fluoride films were fabricated in the same manners as in Samples 1-2, 1-3 and 1-4, respectively.

[Measurement of Amount of Deformation]

An amount of deformation of the film thickness at the time of vertically applying a pressure of 5 [kgf/cm$^2$] during the measurement of a displacement of the film thickness was measured.

<Sample 1-9>

A polyethylene microporous film was fabricated in the same manner as in Sample 1-1.

[Measurement of Amount of Deformation]

An amount of deformation of the film thickness at the time of vertically applying a pressure of 10 [kgf/cm$^2$] during the measurement of a displacement of the film thickness was measured.

<Samples 1-10 to 1-12>

Alumina-containing polyvinylidene fluoride films were fabricated in the same manners as in Samples 1-2, 1-3 and 1-4, respectively.

[Measurement of Amount of Deformation]

An amount of deformation of the film thickness at the time of vertically applying a pressure of 10 [kgf/cm$^2$] during the measurement of a displacement of the film thickness was measured.

<Sample 1-13>

A polyethylene microporous film was fabricated in the same manner as in Sample 1-1.

[Measurement of Amount of Deformation]

An amount of deformation of the film thickness at the time of vertically applying a pressure of 20 [kgf/cm$^2$] during the measurement of a displacement of the film thickness was measured.

<Samples 1-14 to 1-16>

Alumina-containing polyvinylidene fluoride films were fabricated in the same manners as in Samples 1-2, 1-3 and 1-4, respectively.

[Measurement of Amount of Deformation]

An amount of deformation of the film thickness at the time of vertically applying a pressure of 20 [kgf/cm$^2$] during the measurement of a displacement of the film thickness was measured.

The evaluation results of Samples 1-1 to 1-16 are shown in the following Table 1.

TABLE 1

|  |  | Porosity [%] | Thickness [μm] | Mixing amount of alumina [% by mass] | Pressure [kgf/cm$^2$] | Amount of deformation [μm] |
|---|---|---|---|---|---|---|
| Sample 1-1 | Polyethylene microporous film | 60 | 23 | — | 1 | 0.5 |
| Sample 1-2 | Alumina-containing PVdF film | 10 |  |  |  | 0.4 |
| Sample 1-3 |  | 20 |  |  |  | 1.0 |
| Sample 1-4 |  | 60 |  |  |  | 2.0 |
| Sample 1-5 | Polyethylene microporous film | 60 |  | — | 5 | 2.0 |
| Sample 1-6 | Alumina-containing PVdF film | 10 |  |  |  | 1.2 |
| Sample 1-7 |  | 20 |  |  |  | 2.5 |

TABLE 1-continued

|  |  | Porosity [%] | Thickness [μm] | Mixing amount of alumina [% by mass] | Pressure [kgf/cm²] | Amount of deformation [μm] |
|---|---|---|---|---|---|---|
| Sample 1-8 |  | 60 |  |  |  | 3.0 |
| Sample 1-9 | Polyethylene microporous film | 60 |  | — | 10 | 3.0 |
| Sample 1-10 | Alumina-containing PVdF | 10 |  |  |  | 2.0 |
| Sample 1-11 | film | 20 |  |  |  | 4.0 |
| Sample 1-12 |  | 60 |  |  |  | 5.5 |
| Sample 1-13 | Polyethylene microporous film | 60 |  | — | 20 | 4.5 |
| Sample 1-14 | Alumina-containing PVdF | 10 |  |  |  | 3.8 |
| Sample 1-15 | film | 20 |  |  |  | 5.0 |
| Sample 1-16 |  | 60 |  |  |  | 10 |

As is clear from Table 1, it was understood that in the case where the thickness and the porosity are identical as in Sample 1-1 and Sample 1-4, the alumina-containing polyvinylidene film of Sample 1-4 is more easily deformed.

Also, the polyethylene microporous film with a porosity of 60% of Sample 1-1 is of a general configuration capable of being used singly as a separator. On the other hand, the alumina-containing polyvinylidene fluoride film with a porosity of 10% of Sample 1-2 had substantially the same amount of deformation as the polyethylene microporous film of Sample 1-1; and in the case of the alumina-containing polyvinylidene fluoride film with a porosity of 20% as in Sample 1-3, the amount of deformation was large as compared with that of the polyethylene microporous film of Sample 1-1.

Similarly, in Samples 1-5 to 1-16, in the alumina-containing polyvinylidene fluoride films with a porosity of 10%, the amount of deformation was small as compared with that of the polyethylene microporous films with a porosity of 60%. However, in the alumina-containing polyvinylidene fluoride films with a porosity of 20% or more, the amount of deformation was large as compared with that of the polyethylene microporous films with a porosity of 60%, and even when the pressure became large as 20 kgf/cm², the amount of deformation did not change.

In consequence, it was understood that by providing an alumina-containing polyvinylidene fluoride film which is more easily deformed than a polyethylene porous film as a surface layer, on a polyethylene porous film to be used as a substrate of a separator, there is brought an effect for absorbing expansion of an electrode. That is, in the case where the electrode is expanded, the surface layer absorbs the expansion of the electrode before the pores of the substrate are collapsed. According to this, it was understood that the electrolytic solution held by the pores of the substrate is kept well, so that the ion permeability is hardly lowered.

Example 2

In Example 2, a displacement was evaluated when a pressure to an alumina-containing polyvinylidene fluoride film was vertically applied while fixing a mixing amount of alumina to be mixed in the alumina-containing polyvinylidene fluoride film and changing an average particle size of alumina.

<Sample 2-1>
Alumina having an average particle size of 2.3 μm (a size of 10% relative to a thickness of 23 μm) and polyvinylidene fluoride (PVdF) were mixed in a mass ratio of 20/1 (alumina particle/PVdF) in N-methyl-2-pyrrolidone (NMP) to prepare a slurry, and this slurry was coated on a substrate, washed with water and then dried at 70° C. to form an alumina-containing polyvinylidene fluoride film. At that time, the alumina-containing polyvinylidene fluoride film was formed so as to have a thickness of 23 μm and a porosity of 60%.

<Sample 2-2>
An alumina-containing polyvinylidene fluoride film was formed in the same manner as in Sample 2-1, except for changing the average particle size of alumina to 7.0 μm (a size of 30% relative to a thickness of 23 μm).

<Sample 2-3>
An alumina-containing polyvinylidene fluoride film was formed in the same manner as in Sample 2-1, except for changing the average particle size of alumina to 11.5 μm (a size of 50% relative to a thickness of 23 μm).

<Sample 2-4>
An alumina-containing polyvinylidene fluoride film was formed in the same manner as in Sample 2-1, except for changing the average particle size of alumina to 17.25 μm (a size of 75% relative to a thickness of 23 μm).

[Measurement of Amount of Deformation]
An amount of deformation of the film thickness at the time of vertically applying a pressure of 20 [kgf/cm²] during the measurement of a displacement of the film thickness was measured.

The evaluation results of Samples 2-1 to 2-4 are shown in the following Table 2.

TABLE 2

|  | Configuration of film | Porosity [%] | Thickness [μm] | Alumina | | Pressure [kgf/cm²] | Amount of deformation [μm] | Proportion of deformation [%] |
|---|---|---|---|---|---|---|---|---|
|  |  |  |  | Average particle size relative to thickness [%] | Mixing amount [% by mass] |  |  |  |
| Sample 2-1 | Alumina- | 60 | 23 | 10 |  | 20 | 10 | 43 |
| Sample 2-2 | containing |  |  | 30 |  |  | 8.9 | 39 |
| Sample 2-3 | PVdF film |  |  | 50 |  |  | 9.3 | 40 |
| Sample 2-4 |  |  |  | 75 |  |  | 5.2 | 23 |

As is clear from Table 2, in Samples 2-1 to 2-3 in which the average particle size of alumina is not more than 50% relative to the film thickness, the amount of deformation of the film thickness was substantially equal as about 40% of the film thickness. On the other hand, in Sample 2-4 in which the average particle size of alumina is 75% relative to the film thickness, the amount of deformation of the film thickness was conspicuously lowered to 23% as compared with that of Samples 2-1 to 2-3.

It was understood from Example 2 that even if the mixing amount of alumina is fixed, when the average particle size of alumina is too large, a lowering of the amount of deformation of the film thickness, namely a lowering of cushioning properties is generated. It may be considered that this is caused due to the fact that the film thickness is not changed to the thickness of not more than the particle size of alumina.

In consequence, it was understood that the average particle size of the inorganic material particle to be mixed in the surface layer of the separator is preferably not more than 50% of the thickness of the surface layer.

Example 3

In Example 3, a cylindrical battery was fabricated by using the separator composed of a substrate layer and a surface layer according to an embodiment, and its battery characteristics were evaluated.

<Sample 3-1>
[Fabrication of Separator]

A polyethylene microporous film having a thickness of 17 μm and a porosity of 60% was used as a substrate, and a surface layer made of alumina-containing polyvinylidene fluoride having a thickness of 3 μm (6 μm in total) was formed on the both surfaces of the substrate.

The surface layer was formed in the following manner That is, first of all, polyvinylidene fluoride was added with and dissolved in N-methyl-2-pyrrolidone to prepare a solution of polyvinylidene fluoride in N-methyl-2-pyrrolidone. Subsequently, this solution was mixed with alumina having an average particle size of 1 μm in an amount of 70% by mass relative to the mass of the solution and well stirred to prepare a coating slurry. Subsequently, the coating slurry was coated on a polyethylene microporous film, subjected to undergoing phase separation in a water bath and then dried by hot air. There was thus formed a surface layer having a fibril size of polyvinylidene fluoride of not more than 1.0 μm and a porosity of 80%. The fibril size is one obtained by observing a section of the surface layer by an SEM (scanning electron microscope) and determining an average value of diameters of the section of the fibrils.

An air permeability of the completed separator as measured by a Gurley densometer was 350 sec/100 cc. Also, when a pressure of 20 kgf/cm$^2$ was applied to the separator having a surface layer and a substrate laminated therein, as to a displacement of the film thickness, an amount of deformation of the film thickness of the surface layer was 60% relative to the film thickness of the surface layer and an amount of deformation of the film thickness of the substrate layer was 13% relative to the film thickness of the substrate layer.

[Fabrication of Positive Electrode]

94 parts by mass of lithium cobaltate ($LiCoO_2$) as a positive electrode active material, 3 parts by mass of ketjen black as a conductive agent and 3 parts by mass of polyvinylidene fluoride (PVdF) as a binder were mixed to prepare a positive electrode mixture. This positive electrode mixture was dispersed in N-methyl-2-pyrrolidone (NMP) to prepare a positive electrode mixture slurry, and this positive electrode mixture slurry was uniformly coated on the both surfaces of a positive electrode collector made of a strip-shaped aluminum foil. Subsequently, the coated positive electrode mixture slurry was subjected to heat press molding to form a positive electrode active material layer. Finally, a positive electrode terminal made of aluminum (Al) was installed in an exposed area of the positive electrode collector of the positive electrode.

[Preparation of Negative Electrode]

First of all, a negative electrode material of CoSnC-containing material used as negative electrode active material was prepared. In particular, a tin/cobalt/indium/titanium alloy powder and a carbon powder were mixed, from which was then synthesized an SnCoC-containing material by utilizing a mechanochemical reaction. A composition of this SnCoC-containing material was analyzed. As a result, a content of tin was 48% by mass; a content of cobalt was 23% by mass, a content of carbon was 20% by mass; and a proportion of cobalt to the total sum of tin and cobalt (Co/(Sn+Co)) was 32% by mass.

Subsequently, 80 parts by mass of the foregoing SnCoC-containing material powder as a negative electrode active material, 12 parts by mass of graphite as a conductive agent and 8 parts by mass of polyvinylidene fluoride as a binder were mixed, and the mixture was dispersed in N-methyl-2-pyrrolidone as a solvent. Finally, the dispersion was coated on a negative electrode collector made of a copper foil, dried and then subjected to compression molding, thereby forming a negative electrode active material layer.

[Preparation of Electrolytic Solution]

Lithium hexafluorophosphate ($LiPF_6$) was dissolved in a concentration of 1 mole/dm$^3$ in a mixed solvent prepared by mixing ethylene carbonate (EC) and dimethyl carbonate (DMC) in a volume ratio of 1/1, thereby preparing a nonaqueous electrolytic solution.

[Assembling of Battery]

The thus prepared strip-shaped positive electrode and negative electrode were wound plural times via the foregoing separator composed of a substrate and a surface layer, thereby fabricating a wound electrode body of a helical type. This wound electrode body was housed in a nickel-plated iron-made battery can, and an insulating plate was disposed on both of the top and bottom wound surfaces of the wound electrode body. Subsequently, a nickel-made negative electrode terminal connected to the negative electrode collector was welded with the bottom of the battery can. Also, an aluminum-made positive electrode terminal connected to the positive electrode collector was welded with a projection of a safety valve in which electrical continuity with a battery lid was ensured.

Finally, the nonaqueous electrolytic solution was injected into the battery can having the foregoing wound electrode body installed therein, and thereafter, a safety valve, a PTC device and a battery lid were fixed by caulking the battery can via an insulating sealing gasket. There was thus fabricated a cylindrical battery having an outer diameter of 18 mm and a height of 65 mm.

<Sample 3-2>
[Fabrication of Separator]

A mixing amount of alumina was regulated to 85% by mass, and a surface layer was formed so as to have a porosity of 60%. At that time, the diameter of the fibril was not more than 1.0 μm. A separator was fabricated in the same manner as in Sample 3-1, except for the foregoing points.

An air permeability of the completed separator as measured by a Gurley densometer was 300 sec/100 cc. Also, when a pressure of 20 kgf/cm² was applied to the separator having a surface layer and a substrate laminated therein, as to a displacement of the film thickness, an amount of deformation of the film thickness of the surface layer was 40% relative to the film thickness of the surface layer and an amount of deformation of the film thickness of the substrate layer was 15% relative to the film thickness of the substrate layer.

<Sample 3-3>

[Fabrication of Separator]

A mixing amount of alumina was regulated to 90% by mass, polyvinylidene fluoride was fibrillated, and a surface layer was formed so as to have a porosity of 70%. At that time, the diameter of the fibril was not more than 1.0 µm. A separator was fabricated in the same manner as in Sample 3-1, except for the foregoing points.

An air permeability of the completed separator as measured by a Gurley densometer was 290 sec/100 cc. Also, when a pressure of 20 kgf/cm² was applied to the separator having a surface layer and a substrate laminated therein, as to a displacement of the film thickness, an amount of deformation of the film thickness of the surface layer was 30% relative to the film thickness of the surface layer and an amount of deformation of the film thickness of the substrate layer was 17% relative to the film thickness of the substrate layer.

<Sample 3-4>

[Fabrication of Separator]

A mixing amount of alumina was regulated to 60% by mass, and a surface layer was formed so as to have a porosity of 55%. At that time, the diameter of the fibril was from 1.0 to 1.5 µm. A separator was fabricated in the same manner as in Sample 3-1, except for the foregoing points.

An air permeability of the completed separator as measured by a Gurley densometer was 370 sec/100 cc. Also, when a pressure of 20 kgf/cm² was applied to the separator having a surface layer and a substrate laminated therein, as to a displacement of the film thickness, an amount of deformation of the film thickness of the surface layer was 23% relative to the film thickness of the surface layer and an amount of deformation of the film thickness of the substrate layer was 19% relative to the film thickness of the substrate layer.

<Sample 3-5>

[Fabrication of Separator]

A mixing amount of alumina was regulated to 85% by mass, and a surface layer was formed so as to have a porosity of 55%. At that time, the diameter of the fibril was not more than 1.0 µm. A separator was fabricated in the same manner as in Sample 3-1, except for the foregoing points.

An air permeability of the completed separator as measured by a Gurley densometer was 320 sec/100 cc. Also, when a pressure of 20 kgf/cm² was applied to the separator having a surface layer and a substrate laminated therein, as to a displacement of the film thickness, an amount of deformation of the film thickness of the surface layer was 30% relative to the film thickness of the surface layer and an amount of deformation of the film thickness of the substrate layer was 17% relative to the film thickness of the substrate layer.

<Sample 3-6>

[Fabrication of Separator]

A mixing amount of alumina was regulated to 10% by mass, and a surface layer was formed so as to have a porosity of 20%. At that time, the diameter of the fibril was 1.5 µm or more. A separator was fabricated in the same manner as in Sample 3-1, except for the foregoing points.

An air permeability of the completed separator as measured by a Gurley densometer was 400 sec/100 cc. Also, when a pressure of 20 kgf/cm² was applied to the separator having a surface layer and a substrate laminated therein, as to a displacement of the film thickness, an amount of deformation of the film thickness of the surface layer was 10% relative to the film thickness of the surface layer and an amount of deformation of the film thickness of the substrate layer was 23% relative to the film thickness of the substrate layer.

<Sample 3-7>

[Fabrication of Separator]

A 23 µm-thick separator made of a polyethylene microporous film was fabricated. An air permeability of the completed separator as measured by a Gurley densometer was 250 sec/100 cc. When a pressure of 20 kgf/cm² was applied to the separator, an amount of deformation of the film thickness of the substrate layer was 20% relative to the film thickness of the substrate layer.

<Sample 3-8>

[Fabrication of Separator]

A mixing amount of alumina was regulated to 85% by mass, and a surface layer was formed so as to have a porosity of 60%. At that time, the diameter of the fibril was more than 1.0 µm and less than 1.5 µm. A separator was fabricated in the same manner as in Sample 3-1, except for the foregoing points.

An air permeability of the completed separator as measured by a Gurley densometer was 280 sec/100 cc. Also, when a pressure of 20 kgf/cm² was applied to the separator having a surface layer and a substrate laminated therein, as to a displacement of the film thickness, an amount of deformation of the film thickness of the surface layer was 34% relative to the film thickness of the surface layer and an amount of deformation of the film thickness of the substrate layer was 16% relative to the film thickness of the substrate layer.

<Sample 3-9>

[Fabrication of Separator]

A mixing amount of alumina was regulated to 85% by mass, and a surface layer was formed so as to have a porosity of 60%. At that time, the diameter of the fibril was 1.5 µm or more. A separator was fabricated in the same manner as in Sample 3-1, except for the foregoing points.

An air permeability of the completed separator as measured by a Gurley densometer was 260 sec/100 cc. Also, when a pressure of 20 kgf/cm² was applied to the separator having a surface layer and a substrate laminated therein, as to a displacement of the film thickness, an amount of deformation of the film thickness of the surface layer was 25% relative to the film thickness of the surface layer and an amount of deformation of the film thickness of the substrate layer was 18% relative to the film thickness of the substrate layer.

<Sample 3-10>

[Fabrication of Separator]

A polyethylene microporous film having a thickness of 12 µm and a porosity of 60% was used as a substrate, and a surface layer made of alumina-containing polyvinylidene fluoride having a thickness of 2.5 µm (5 µm in total) was formed on the both surfaces of the substrate.

A surface layer was formed such that a mixing amount of alumina was regulated to 85% by mass, and a porosity thereof became 60%. At that time, the diameter of the fibril was less than 1.0 µm. A separator was fabricated in the same manner as in Sample 3-1, except for the foregoing points.

An air permeability of the completed separator as measured by a Gurley densometer was 400 sec/100 cc. Also, when a pressure of 20 kgf/cm² was applied to the separator having a surface layer and a substrate laminated therein, as to a displacement of the film thickness, an amount of deformation of the film thickness of the surface layer was 50% relative to the film thickness of the surface layer and an amount of deformation of the film thickness of the substrate layer was 15% relative to the film thickness of the substrate layer.

<Sample 3-11>
[Fabrication of Separator]
A separator was fabricated in the same manner as in Sample 3-10, except that the surface layer was not formed.
An air permeability of the completed separator as measured by a Gurley densometer was 360 sec/100 cc. Also, when a pressure of 20 kgf/cm² was applied to the separator, as to a displacement of the film thickness, an amount of deformation of the film thickness of the substrate layer was 22% relative to the film thickness of the substrate layer.

<Sample 3-12>
[Fabrication of Separator]
A mixing amount of alumina was regulated to 60% by mass, and a surface layer was formed so as to have a porosity of 55%. At that time, the diameter of the fibril was more than 1.0 μm and less than 1.5 μm. A separator was fabricated in the same manner as in Sample 3-10, except for the foregoing points.
An air permeability of the completed separator as measured by a Gurley densometer was 410 sec/100 cc. Also, when a pressure of 20 kgf/cm² was applied to the separator having a surface layer and a substrate laminated therein, as to a displacement of the film thickness, an amount of deformation of the film thickness of the surface layer was 20% relative to the film thickness of the surface layer and an amount of deformation of the film thickness of the substrate layer was 24% relative to the film thickness of the substrate layer.

<Sample 3-13>
[Fabrication of Separator]
A mixing amount of alumina was regulated to 10% by mass, and a surface layer was formed so as to have a porosity of 20%. At that time, the diameter of the fibril was 1.5 μm or more. A separator was fabricated in the same manner as in Sample 3-10, except for the foregoing points.
An air permeability of the completed separator as measured by a Gurley densometer was 450 sec/100 cc. Also, when a pressure of 20 kgf/cm² was applied to the separator having a surface layer and a substrate laminated therein, as to a displacement of the film thickness, an amount of deformation of the film thickness of the surface layer was 14% relative to the film thickness of the surface layer and an amount of deformation of the film thickness of the substrate layer was 29% relative to the film thickness of the substrate layer.

[Evaluation of Cylindrical Battery]
(a) Strain Amount of Battery Cell at the Time of Charge
As to each of the cylindrical batteries of the fabricated samples, a diameter of the battery before the charge was measured. Thereafter, the battery was subjected to constant-current charge at a charge current of 1 C; at a point of time when the battery voltage reached 4.2 V, the charge manner was switched to constant-voltage charge; and the charge was carried out until a total charge time reached 2.5 hours.

Subsequently, a peripheral length of the cylindrical battery in a fully charged state was measured, and a difference between a diameter of the cylindrical battery in a fully charged state and a diameter of the cylindrical battery before the charge was defined as a strain amount of the battery cell at the time of charge.

(b) Continuous Charge Test
In the continuous charge test, the battery in a fully charged state was placed at a circumferential temperature of 60° C. and subjected to constant-voltage charged while keeping the charge voltage. Then, after starting the test, a time until the charge current which had decreased by keeping the fully charged voltage again increased and reached 5 mA or more (a leakage current is generated) was measured. The time of the continuous charge test is regulated to up to 1,000 hours.

In this test, since immediately after starting the observation, the battery keeps the constant voltage, the charge current decreases immediately after the battery voltage has reached the charge voltage. Thereafter, when the charge at a constant voltage is continued, there is observed a tendency that the charge current which has once decreased again increases. It may be considered that this suggests that some chemical reaction reveals in the inside of the battery, and such is an index to evaluate oxidation or stability at high temperatures of the battery. In this test, the battery is evaluated such that the longer the time until the charge current again increases, the higher the oxidation resistance or stability at high temperature is.

(c) Measurement of Capacity Retention Rate
The battery was subjected to constant-current charge at a charge current of 1 C under a circumstance at 23° C.; at a point of time when the battery voltage reached 4.2 V, the charge manner was switched to constant-voltage charge; and the charge was carried out until a total charge time reached 2.5 hours. Thereafter, the battery was discharged at a discharge current of 0.5 C, and at a point of time when the battery voltage reached 2.5 V, the discharged was finished. At that time, a discharge capacity was determined as an initial capacity.

Charge and discharge were carried out under the foregoing charge and discharge condition, and a discharge capacity at the 300th cycle was measured. A capacity retention rate at the 300th cycle was determined according to the following expression.

Capacity retention rate (%) at the 300th cycle= {(Discharge capacity at the 300th cycle)/(Initial capacity)}×100

The evaluation results of Samples 3-1 to 3-7 are shown in the following Table 3.

TABLE 3

| | Total thickness [μm] | Substrate layer Thickness [μm] | Surface layer | | | |
| --- | --- | --- | --- | --- | --- | --- |
| | | | Thickness [μm] | Porosity [%] | Mixing amount of alumina [% by mass] | Diameter of fibril [μm] |
| Sample 3-1 | 23 | 17 | 6 | 80 | 70 | ≤1.0 |
| Sample 3-2 | | 17 | 6 | 60 | 85 | ≤1.0 |
| Sample 3-3 | | 17 | 6 | 70 | 90 | ≤1.0 |
| Sample 3-4 | | 17 | 6 | 55 | 60 | 1.0 to 1.5 |
| Sample 3-5 | | 17 | 6 | 55 | 85 | ≤1.0 |

TABLE 3-continued

| | | | | | | |
|---|---|---|---|---|---|---|
| Sample 3-6 | | 17 | 6 | 20 | 10 | ≥1.5 |
| Sample 3-7 | | 23 | — | — | — | — |
| Sample 3-8 | | 17 | 6 | 60 | 85 | 1.0 < to < 1.5 |
| Sample 3-9 | | 17 | 6 | 60 | 85 | ≥1.5 |
| Sample 3-10 | 17 | 12 | 5 | 60 | 85 | ≤1.0 |
| Sample 3-11 | 17 | — | — | — | — | — |
| Sample 3-12 | 17 | 12 | 5 | 55 | 60 | 1.0 < to < 1.5 |
| Sample 3-13 | 17 | 12 | 6 | 20 | 10 | ≥1.5 |

| | Amount of deformation at the time of pressure loading | | | Strain amount | | |
|---|---|---|---|---|---|---|
| | Amount of deformation of surface layer [%] | Amount of deformation of substrate layer [%] | Air permeability [sec/100 cc] | of battery cell at the time of charge [mm] | Continuous charge test at 60° C. [hr] | Capacity retention rate at 300th cycle [%] |
| Sample 3-1 | 60 | 13 | 350 | 0 | ≥1,000 | 70 |
| Sample 3-2 | 40 | 15 | 300 | 0 | ≥1,000 | 70 |
| Sample 3-3 | 30 | 17 | 290 | 0 | ≥1,000 | 69 |
| Sample 3-4 | 23 | 19 | 370 | 0.15 | ≥1,000 | 65 |
| Sample 3-5 | 30 | 17 | 320 | 0 | ≥1,000 | 66 |
| Sample 3-6 | 10 | 23 | 400 | 0.2 | ≥1,000 | 60 |
| Sample 3-7 | — | 20 | 250 | 0.2 | 200 | 59 |
| Sample 3-8 | 34 | 16 | 280 | 0.1 | ≥1,000 | 65 |
| Sample 3-9 | 25 | 18 | 260 | 0.15 | ≥1,000 | 63 |
| Sample 3-10 | 50 | 15 | 400 | 0.2 | ≥1,000 | 53 |
| Sample 3-11 | — | 22 | 360 | 0.25 | 300 | 47 |
| Sample 3-12 | 20 | 24 | 410 | 0.2 | ≥1,000 | 51 |
| Sample 3-13 | 14 | 29 | 450 | 0.2 | ≥1,000 | 48 |

As is clear from Table 3, it was understood that as to the amount of deformation of the surface layer, when the amount of deformation of the substrate layer is large, the expansion of the electrode is absorbed by the surface layer, so that collapse of the substrate (collapse of pores of the substrate) is suppressed.

Also, even when the amount of deformation of the substrate layer was the same degree as that of the surface layer, the strain of the battery cell was generated; however, the characteristics could be enhanced because of the oxidation resistance of the surface by the inorganic material particle, as compared with Sample 1-7 which is not provided with a surface layer.

On the other hand, in the case where the amount of deformation of the substrate layer is larger than that of the surface layer, the strain is generated, and furthermore, the characteristics are deteriorated without being compensated by the oxidation resistance.

In the light of the above, it was understood that by providing a surface layer having high cushioning properties and having oxidation resistance, the stability of the separator is enhanced.

Example 4

In Example 4, a cylindrical battery was fabricated by using a material having a different expansion coefficient, and its capacity retention rate was evaluated.

<Sample 4-1>
[Fabrication of Separator]

A polyethylene microporous film having a thickness of 17 μm and a porosity of 60% was used as a substrate, and a surface layer made of alumina-containing polyvinylidene fluoride having a thickness of 3 μm (6 μm in total) was formed on the both surfaces of the substrate. The surface layer was fabricated by mixing 85% by mass of alumina having an average particle size of 1 μm and kneading the mixture, so as to have a porosity of 60%.

[Fabrication of Negative Electrode]

95% by mass of a graphite powder as a negative electrode active material and 5% by mass of polyvinylidene fluoride (PVdF) as a binder were mixed to prepare a negative electrode mixture. This negative electrode mixture was dispersed in N-methyl-2-pyrrolidone (NMP) to prepare a negative electrode mixture slurry, and the negative electrode mixture slurry was uniformly coated on the both surfaces of a negative electrode collector made of a strip-shaped copper foil. Subsequently, the coated negative electrode mixture slurry was subjected to heat press molding to form a negative electrode active material layer. Finally, a negative electrode terminal made of nickel (Ni) was installed in an exposed area of the negative electrode collector of the negative electrode.

The thus fabricated negative electrode had a ratio of an electrode thickness at the time of charge to an electrode thickness at the time of discharge [(electrode thickness at the time of charge)/(electrode thickness at the time of discharge)] of 1.

A cylindrical battery was fabricated in the same manner as in Sample 3-1, except for using the foregoing negative electrode and separator.

<Sample 4-2>

A cylindrical battery was fabricated in the same manner as in Sample 4-1, except for using, as the negative electrode, an alloy having a proportion of cobalt to the total sum of tin and cobalt (Co/(Sn+Co)) of 32% by mass. The negative electrode of Sample 4-2 had a ratio of an electrode thickness at the time of charge to an electrode thickness at the time of discharge [(electrode thickness at the time of charge)/(electrode thickness at the time of discharge)] of 1.2.

<Sample 4-3>

A cylindrical battery was fabricated in the same manner as in Sample 4-1, except for using, as the negative electrode, an alloy having a proportion of cobalt to the total sum of tin and cobalt (Co/(Sn+Co)) of 35% by mass. The negative electrode of Sample 4-3 had a ratio of an electrode thickness at the time of charge to an electrode thickness at the time of discharge [(electrode thickness at the time of charge)/(electrode thickness at the time of discharge)] of 1.5.

<Sample 4-4>

A cylindrical battery was fabricated in the same manner as in Sample 4-1, except for using, as the negative electrode, an alloy having a proportion of cobalt to the total sum of tin and cobalt (Co/(Sn+Co)) of 37% by mass. The negative electrode of Sample 4-4 had a ratio of an electrode thickness at the time of charge to an electrode thickness at the time of discharge [(electrode thickness at the time of charge)/(electrode thickness at the time of discharge)] of 2.0.

<Sample 4-5>

A cylindrical battery was fabricated in the same manner as in Sample 4-1, except for using, as the negative electrode, an alloy having a proportion of cobalt to the total sum of tin and cobalt (Co/(Sn+Co)) of 41% by mass. The negative electrode of Sample 4-5 had a ratio of an electrode thickness at the time of charge to an electrode thickness at the time of discharge [(electrode thickness at the time of charge)/(electrode thickness at the time of discharge)] of 3.0.

<Sample 4-6>

A cylindrical battery was fabricated in the same manner as in Sample 4-1, except for using, as the negative electrode, an alloy having a proportion of cobalt to the total sum of tin and cobalt (Co/(Sn+Co)) of 45% by mass. The negative electrode of Sample 4-6 had a ratio of an electrode thickness at the time of charge to an electrode thickness at the time of discharge [(electrode thickness at the time of charge)/(electrode thickness at the time of discharge)] of 3.5.

<Sample 4-7>

A cylindrical battery was fabricated in the same manner as in Sample 4-1, except for using, as the separator, a polyethylene microporous film having a thickness of 23 μm and a porosity of 60%. The negative electrode of Sample 4-7 had a ratio of an electrode thickness at the time of charge to an electrode thickness at the time of discharge [(electrode thickness at the time of charge)/(electrode thickness at the time of discharge)] of 1.0.

<Sample 4-8>

A cylindrical battery was fabricated in the same manner as in Sample 4-1, except for using, as the separator, a polyethylene microporous film having a thickness of 23 μm and a porosity of 60% and using, as the negative electrode, an alloy having a proportion of cobalt to the total sum of tin and cobalt (Co/(Sn+Co)) of 32% by mass. The negative electrode of Sample 4-8 had a ratio of an electrode thickness at the time of charge to an electrode thickness at the time of discharge [(electrode thickness at the time of charge)/(electrode thickness at the time of discharge)] of 1.2.

<Sample 4-9>

A cylindrical battery was fabricated in the same manner as in Sample 4-1, except for using, as the separator, a polyethylene microporous film having a thickness of 23 μm and a porosity of 60% and using, as the negative electrode, an alloy having a proportion of cobalt to the total sum of tin and cobalt (Co/(Sn+Co)) of 35% by mass. The negative electrode of Sample 4-9 had a ratio of an electrode thickness at the time of charge to an electrode thickness at the time of discharge [(electrode thickness at the time of charge)/(electrode thickness at the time of discharge)] of 1.5.

<Sample 4-10>

A cylindrical battery was fabricated in the same manner as in Sample 4-1, except for using, as the separator, a polyethylene microporous film having a thickness of 23 μm and a porosity of 60% and using, as the negative electrode, an alloy having a proportion of cobalt to the total sum of tin and cobalt (Co/(Sn+Co)) of 37% by mass. The negative electrode of Sample 4-10 had a ratio of an electrode thickness at the time of charge to an electrode thickness at the time of discharge [(electrode thickness at the time of charge)/(electrode thickness at the time of discharge)] of 2.0.

<Sample 4-11>

A cylindrical battery was fabricated in the same manner as in Sample 4-1, except for using, as the separator, a polyethylene microporous film having a thickness of 23 μm and a porosity of 60% and using, as the negative electrode, an alloy having a proportion of cobalt to the total sum of tin and cobalt (Co/(Sn+Co)) of 41% by mass. The negative electrode of Sample 4-11 had a ratio of an electrode thickness at the time of charge to an electrode thickness at the time of discharge [(electrode thickness at the time of charge)/(electrode thickness at the time of discharge)] of 3.0.

<Sample 4-12>

A cylindrical battery was fabricated in the same manner as in Sample 4-1, except for using, as the separator, a polyethylene microporous film having a thickness of 23 μm and a porosity of 60% and using, as the negative electrode, an alloy having a proportion of cobalt to the total sum of tin and cobalt (Co/(Sn+Co)) of 45% by mass. The negative electrode of Sample 4-12 had a ratio of an electrode thickness at the time of charge to an electrode thickness at the time of discharge [(electrode thickness at the time of charge)/(electrode thickness at the time of discharge)] of 3.5.

[Evaluation of Cylindrical Battery]

Charge and discharge were repeated up to 300 cycles under the same condition as in the measurement of capacity retention rate of Example 3, thereby determining a capacity retention rate at the 300th cycle.

The evaluation results of Samples 4-1 to 4-12 are shown in the following Table 4.

TABLE 4

| | Expansion degree of negative electrode | Separator | | | Capacity retention rate [%] |
| | | Substrate | Surface layer | Inorganic material contained in surface layer | |
|---|---|---|---|---|---|
| Sample 4-1 | 1.0 | Polyethylene | Yes | Alumina | 82 |
| Sample 4-2 | 1.2 | Polyethylene | Yes | Alumina | 68 |
| Sample 4-3 | 1.5 | Polyethylene | Yes | Alumina | 60 |
| Sample 4-4 | 2.0 | Polyethylene | Yes | Alumina | 33 |
| Sample 4-5 | 3.0 | Polyethylene | Yes | Alumina | 15 |
| Sample 4-6 | 3.5 | Polyethylene | Yes | Alumina | 0 |
| Sample 4-7 | 1.0 | Polyethylene | No | — | 81 |
| Sample 4-8 | 1.2 | Polyethylene | No | — | 59 |
| Sample 4-9 | 1.5 | Polyethylene | No | — | 47 |
| Sample 4-10 | 2.0 | Polyethylene | No | — | 23 |
| Sample 4-11 | 3.0 | Polyethylene | No | — | 10 |
| Sample 4-12 | 3.5 | Polyethylene | No | — | 0 |

As is clear from Table 4, when Sample 4-1 and Sample 4-7 each having an expansion degree of negative electrode of 1.0 are compared, the capacity retention rate is substantially equal to each other, and a lowering of the battery characteristics is not substantially found. It may be considered that this is caused due to the fact that since the negative electrode does not expand, it is not necessary to absorb the expansion of the negative electrode by the surface layer made of alumina-containing polyvinylidene fluoride, so that the battery characteristics can be kept even by a separator composed only of a substrate.

Also, in Sample 4-6 and Sample 4-12 each having an expansion degree of negative electrode of 3.5, the capacity retention rate was conspicuously lowered to 0%, and an enhancement of the capacity retention rate to be brought in view of the fact that a surface layer made of alumina-containing polyvinylidene fluoride is present was not found.

It may be considered that this is caused due to the fact that since the expansion of the negative electrode is excessively large, not only the expansion of the negative electrode cannot be absorbed by the separator having a surface layer made of alumina-containing polyvinylidene fluoride provided therein, but voids are collapsed in both the substrate and the surface layer; and that deterioration of the active material is one of factors.

On the other hand, when Sample 4-2 and Sample 4-8 each having an expansion degree of negative electrode of 1.2 are compared, Sample 4-2 having a surface layer made of alumina-containing polyvinylidene fluoride could enhance the capacity retention rate. Also, in each of the samples having an expansion degree of negative electrodes of 1.5 or more and not more than 3.0, the same results were obtained.

It may be considered that in the range where the expansion degree of negative electrode is from 1.2 to 3.0, voids of the substrate were hardly collapsed by absorption of the expansion of the negative electrode by the surface layer, so that the capacity retention rate could be enhanced.

Example 5

In Example 5, a cylindrical battery was fabricated by using a negative electrode active material different from that of Example 4 and using a material having a different expansion coefficient, and its capacity retention rate was evaluated.

<Sample 5-1>

[Fabrication of Separator]

A polyethylene microporous film having a thickness of 17 μm and a porosity of 60% was used as a substrate, and a surface layer made of alumina-containing polyvinylidene fluoride having a thickness of 3 μm (6 μm in total) was formed on the both surfaces of the substrate. The surface layer was fabricated by mixing 85% by mass of alumina having an average particle size of 1 μm and kneading the mixture, so as to have a porosity of 60%.

[Fabrication of Negative Electrode]

A negative electrode active material was made first. That is, silicon powder, titanium powder, carbon powder and boron powder were prepared as raw materials. Silicon powder and titanium powder were alloyed to give silicon/titanium alloy powder, and thereafter carbon powder and boron powder were added to the alloy powder and the resulting mixture was dry mixed. At this time, the ratio of the raw materials (raw material ratio: % by mass) was changed as shown in Table 5. Specifically, the raw material ratio of boron was 10% by mass, the ratio of the raw material ratio of silicon relative to the total of the raw materials of silicon and titanium (hereinafter referred to as [Si/(Si+Ti)]) was constant, and the raw material ratio of carbon was changed in the range from 5% by mass to 20% by mass. Subsequently, the mixture described above was placed in a reaction chamber of a planetary ball mill (manufactured by Ito Seisakusho Co., Ltd.) together with about 400 g of steel balls having a diameter of 9 mm. Then, the atmosphere in the reaction chamber was replaced by argon (Ar) and operation at a rotation speed of 250 rpm for 10 minutes and pausing for 10 minutes were repeated until the total of the operation time reaches 50 hours. Finally, the reaction chamber was cooled to room temperature, synthesized negative electrode active material was taken out from the chamber and sieved through a 280-mesh sieve to remove coarse powder.

Then, 95% by mass of the negative electrode active material and 5% by mass of polyvinylidene fluoride (PVdF) as a binder were mixed to prepare a negative electrode mixture. This negative electrode mixture was dispersed in N-methyl-2-pyrrolidone (NMP) to prepare a negative electrode mixture slurry, and the negative electrode mixture slurry was uniformly coated on the both surfaces of a negative electrode collector made of a strip-shaped copper foil. Subsequently, the coated negative electrode mixture slurry was subjected to heat press molding to form a negative electrode active material layer. Finally, a negative electrode terminal made of nickel (Ni) was installed in an exposed area of the negative electrode collector of the negative electrode.

The thus fabricated negative electrode had a ratio of an electrode thickness at the time of charge to an electrode thickness at the time of discharge [(electrode thickness at the time of charge)/(electrode thickness at the time of discharge)] of 2.5.

A cylindrical battery was fabricated in the same manner as in Sample 3-1, except for using the foregoing negative electrode and separator.

<Sample 5-2>

A cylindrical battery was fabricated in the same manner as in Sample 5-1, except for using, as the separator, the separator used in Sample 3-6.

<Sample 5-3>

A cylindrical battery was fabricated in the same manner as in Sample 5-1, except for using, as the separator, the separator used in Sample 3-7.

<Sample 5-4>

A cylindrical battery was fabricated in the same manner as in Sample 5-1, except for using, as the negative electrode active material, an alloy having the ratio of silicon, titanium and boron shown in Table 5. The negative electrode of Sample 5-4 had a ratio of an electrode thickness at the time of charge to an electrode thickness at the time of discharge [(electrode thickness at the time of charge)/(electrode thickness at the time of discharge)] of 2.2.

<Sample 5-5>

A cylindrical battery was fabricated in the same manner as in Sample 5-4, except for using, as the separator, the separator used in Sample 3-6.

<Sample 5-6>

A cylindrical battery was fabricated in the same manner as in Sample 5-4, except for using, as the separator, the separator used in Sample 3-7.

<Sample 5-7>

A cylindrical battery was fabricated in the same manner as in Sample 5-1, except for using, as the negative electrode active material, an alloy having the ratio of silicon, titanium and carbon shown in Table 5. The negative electrode of Sample 5-7 had a ratio of an electrode thickness at the time of charge to an electrode thickness at the time of discharge [(electrode thickness at the time of charge)/(electrode thickness at the time of discharge)] of 2.2.

<Sample 5-8>

A cylindrical battery was fabricated in the same manner as in Sample 5-7, except for using, as the separator, the separator used in Sample 3-6.

<Sample 5-9>

A cylindrical battery was fabricated in the same manner as in Sample 5-7, except for using, as the separator, the separator used in Sample 3-7.

<Sample 5-10>
A cylindrical battery was fabricated in the same manner as in Sample 5-1, except for using, as the negative electrode active material, an alloy having the ratio of silicon, titanium, carbon and boron shown in Table 5. The negative electrode of Sample 5-10 had a ratio of an electrode thickness at the time of charge to an electrode thickness at the time of discharge [(electrode thickness at the time of charge)/(electrode thickness at the time of discharge)] of 2.0.

<Sample 5-11>
A cylindrical battery was fabricated in the same manner as in Sample 5-10, except for using, as the separator, the separator used in Sample 3-6.

<Sample 5-12>
A cylindrical battery was fabricated in the same manner as in Sample 5-10, except for using, as the separator, the separator used in Sample 3-7.

<Sample 5-13>
A cylindrical battery was fabricated in the same manner as in Sample 5-1, except for using, as the negative electrode active material, an alloy having the ratio of silicon, cobalt, carbon and boron shown in Table 5. The negative electrode of Sample 5-13 had a ratio of an electrode thickness at the time of charge to an electrode thickness at the time of discharge [(electrode thickness at the time of charge)/(electrode thickness at the time of discharge)] of 1.9.

<Sample 5-14>
A cylindrical battery was fabricated in the same manner as in Sample 5-13, except for using, as the separator, the separator used in Sample 3-6.

<Sample 5-15>
A cylindrical battery was fabricated in the same manner as in Sample 5-13, except for using, as the separator, the separator used in Sample 3-7.

[Evaluation of Cylindrical Battery]

Charge and discharge were repeated up to 300 cycles under the same condition as in the measurement of capacity retention rate of Example 3, thereby determining a capacity retention rate at the 300th cycle. Also, a time until the charge current again increased and reached 5 mA or more (a leakage current is generated) was measured in the same condition as in the continuous charge test in Example 3.

The evaluation results of Samples 5-1 to 5-15 are shown in the following Table 5.

TABLE 5

|  | Total thickness [μm] | Substrate layer Thickness [μm] | Surface layer | | | |
|---|---|---|---|---|---|---|
|  |  |  | Thickness [μm] | Porosity [%] | Mixing amount of alumina [% by mass] | Diameter of fibril [μm] |
| Sample 5-1 | 23 | 17 | 6 | 60 | 85 | ≤1.0 |
| Sample 5-2 |  | 17 | 6 | 20 | 10 | ≥1.5 |
| Sample 5-3 |  | 23 | — | — | — | — |
| Sample 5-4 |  | 17 | 6 | 60 | 85 | ≤1.0 |
| Sample 5-5 |  | 17 | 6 | 20 | 10 | ≥1.5 |
| Sample 5-6 |  | 23 | — | — | — | — |
| Sample 5-7 |  | 17 | 6 | 60 | 85 | ≤1.0 |
| Sample 5-8 |  | 17 | 6 | 20 | 10 | ≥1.5 |
| Sample 5-9 |  | 23 | — | — | — | — |
| Sample 5-10 |  | 17 | 6 | 60 | 85 | ≤1.0 |
| Sample 5-11 |  | 17 | 6 | 20 | 10 | ≥1.5 |
| Sample 5-12 |  | 23 | — | — | — | — |
| Sample 5-13 |  | 17 | 6 | 60 | 85 | ≤1.0 |
| Sample 5-14 |  | 17 | 6 | 20 | 10 | ≥1.5 |
| Sample 5-15 |  | 23 | — | — | — | — |

|  | Amount of deformation at the time of pressure loading | | Air permeability [sec/100 cc] | Expansion degree of negative electrode | Capacity retention rate at 300th cycle [%] | Continuous charge test at 60° C. [hr] | Strain amount of battery cell at the time of charge [mm] |
|---|---|---|---|---|---|---|---|
|  | Amount of deformation of surface layer [%] | Amount of deformation of substrate layer [%] |  |  |  |  |  |
| Sample 5-1 | 40 | 15 | 300 | 2.5 | 5 | ≥1000 | 0.3 |
| Sample 5-2 | 10 | 23 | 400 | 2.5 | 4 | ≥1000 | 0.3 |
| Sample 5-3 | — | 20 | 260 | 2.5 | 3 | 130 | 0.3 |
| Sample 5-4 | 40 | 15 | 300 | 2.2 | 32 | ≥1000 | 0.2 |
| Sample 5-5 | 10 | 23 | 400 | 2.2 | 28 | ≥1000 | 0.25 |
| Sample 5-6 | — | 20 | 260 | 2.2 | 27 | 100 | 0.25 |
| Sample 5-7 | 40 | 15 | 300 | 2.2 | 31 | ≥1000 | 0.2 |
| Sample 5-8 | 10 | 23 | 400 | 2.2 | 26 | ≥1000 | 0.25 |
| Sample 5-9 | — | 20 | 260 | 2.2 | 24 | 120 | 0.25 |
| Sample 5-10 | 40 | 15 | 300 | 2.0 | 74 | ≥1000 | 0.15 |
| Sample 5-11 | 10 | 23 | 400 | 2.0 | 66 | ≥1000 | 0.2 |
| Sample 5-12 | — | 20 | 260 | 2.0 | 63 | 200 | 0.2 |
| Sample 5-13 | 40 | 15 | 300 | 1.9 | 73 | ≥1000 | 0.15 |
| Sample 5-14 | 10 | 23 | 400 | 1.9 | 68 | ≥1000 | 0.2 |
| Sample 5-15 | — | 20 | 260 | 1.9 | 65 | 200 | 0.2 |

|  | Raw Material Mass Ratio | | | | |
|---|---|---|---|---|---|
|  | Silicon (Si) | Titanium (Ti) | Cobalt (Co) | Carbon (C) | Boron (B) |
| Sample 5-1 | 85 | 15 | 0 | 0 | 0 |
| Sample 5-2 | 85 | 15 | 0 | 0 | 0 |

TABLE 5-continued

| Sample | Col1 | Col2 | Col3 | Col4 | Col5 |
|---|---|---|---|---|---|
| Sample 5-3 | 85 | 15 | 0 | 0 | 0 |
| Sample 5-4 | 76.5 | 13.5 | 0 | 0 | 10 |
| Sample 5-5 | 76.5 | 13.5 | 0 | 0 | 10 |
| Sample 5-6 | 76.5 | 13.5 | 0 | 0 | 10 |
| Sample 5-7 | 76.5 | 13.5 | 0 | 10 | 0 |
| Sample 5-8 | 76.5 | 13.5 | 0 | 10 | 0 |
| Sample 5-9 | 76.5 | 13.5 | 0 | 10 | 0 |
| Sample 5-10 | 68 | 12 | 0 | 10 | 10 |
| Sample 5-11 | 68 | 12 | 0 | 10 | 10 |
| Sample 5-12 | 68 | 12 | 0 | 10 | 10 |
| Sample 5-13 | 68 | 0 | 12 | 10 | 10 |
| Sample 5-14 | 68 | 0 | 12 | 10 | 10 |
| Sample 5-15 | 68 | 0 | 12 | 10 | 10 |

As is clear from Table 5, the battery with the negative electrode using the negative electrode material including Si as a composing element and the separators having the surface layer formed on the substrate layer showed good continuous charge characteristics despite of expansion of negative electrode. Particularly, even in the batteries whose negative electrode has an expansion degree of negative electrode of 1.9 to 2.5 showed good continuous charge characteristics. However, good capacity retention rate at the 300th cycle was obtained only in the batteries using the separator whose amount of deformation of the surface layer is larger than the amount of deformation of the substrate layer.

Various modifications and applications can be made. For example, its shape is not particularly limited but may be a rectangular type, a coin type or a button type.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
a positive electrode;
a negative electrode; and
a separator disposed between the positive electrode and the negative electrode,
wherein the separator comprises
a substrate layer, and
a surface layer formed on at least one principal plane of the substrate layer,
wherein the surface layer comprises fibrils made of polyvinylidene fluoride having an average diameter of not more than 1.0 μm and inorganic particles composing at least 70 wt % of the surface layer.

2. The battery according to claim 1, wherein the negative electrode has a negative electrode active material comprising at least one member selected from silicon and tin.

3. The battery according to claim 1, wherein the negative electrode active material is a material comprising:
a first constituent element,
a second constituent element, and
a third constituent element;
the first constituent element is silicon or tin;
the second constituent element is at least one member selected from the group consisting of cobalt, iron, magnesium, titanium, vanadium, chromium, manganese, nickel, copper, zinc, gallium, zirconium, niobium, molybdenum, silver, indium, cerium, hafnium, tantalum, tungsten, bismuth and silicon; and
the third constituent element is at least one member selected from the group consisting of boron, carbon, aluminum and phosphorus.

4. The battery according to claim 1, wherein a porosity of the surface layer is 20% or more and not more than 90%.

5. The battery according to claim 1, wherein an average particle size of the inorganic particles is not more than 50% relative to a thickness of the surface layer.

6. The battery according to claim 1, wherein the inorganic particles comprise alumina or silica.

7. The battery according to claim 1, wherein the substrate layer comprises a polyolefin resin.

8. A separator comprising:
a substrate layer, and
a surface layer formed on at least one principal plane of the substrate layer, wherein the surface layer comprises fibrils made of polyvinylidene fluoride having an average diameter of not more than 1.0 μm and inorganic particles composing at least 70 wt % of the surface layer.

9. The separator according to claim 8, wherein a porosity of the surface layer is 20% or more and not more than 90%.

10. The separator according to claim 8, wherein the inorganic particles comprise alumina or silica.

11. The separator according to claim 8, wherein the substrate layer comprises a polyolefin resin.

12. The battery according to claim 1, wherein the surface layer comprises a three-dimensional network structure in which fibrils made of the polyvinylidene fluoride as a component are continuously connected with each other.

13. The battery according to claim 1, wherein an amount of deformation against pressure of the surface layer is larger than that of the substrate layer.

14. The battery according to claim 13, wherein the deformation is measured by vertically applying a pressure of 1, 5, 10 or 20 kgf/cm$^2$ and measurement of a displacement of the surface layer or the substrate layer.

15. The battery according to claim 14, wherein the deformation of the surface layer measured by vertically applying the pressure of 20 kgf/cm$^2$ ranges from 23% to 60%.

16. The battery according to claim 1, wherein an air permeability of the separator as measured by a Gurley densometer ranges from 250 to 400 sec/100 cc.

17. The battery according to claim 1, wherein a thickness of the substrate layer ranges from 12 μm to 23 μm.

18. The battery according to claim 1, wherein the negative electrode active material is a material comprising:
a first constituent element, and
a second constituent element,
the first constituent element is silicon or tin; and
the second constituent element is oxygen (O) or carbon (C).

19. An electronic appliance comprising the battery according to claim 1.

* * * * *